United States Patent [19]
Hiller et al.

[11] Patent Number: 5,345,446
[45] Date of Patent: Sep. 6, 1994

[54] ESTABLISHING TELECOMMUNICATIONS CALL PATHS IN BROADBAND COMMUNICATION NETWORKS

[75] Inventors: Thomas L. Hiller, Glen Ellyn; James J. Phelan, Downers Grove; Meyer J. Zola, Oak Park, all of Ill.

[73] Assignee: AT&T Bell Laboratories, Murray Hill, N.J.

[21] Appl. No.: 972,789

[22] Filed: Nov. 6, 1992

[51] Int. Cl.$^5$ .............................................. H04L 12/50
[52] U.S. Cl. ..................... 370/60.1; 370/94.2
[58] Field of Search ............... 370/94.2, 94.1, 60, 370/60.1, 85.6, 100.1, 84, 58.1, 58.2, 58.3, 110.1; 354/117, 115; 340/825.5, 825.51, 825.52

[56] References Cited

U.S. PATENT DOCUMENTS

| | | | |
|---|---|---|---|
| 5,093,827 | 3/1992 | Franklin et al. | 372/60.1 |
| 5,189,410 | 2/1993 | Kosugi et al. | 370/58.3 |
| 5,204,882 | 4/1993 | Chao et al. | 370/94.1 |
| 5,214,639 | 5/1993 | Herion | 370/60 |
| 5,233,606 | 8/1993 | Pashan et al. | 370/60 |

FOREIGN PATENT DOCUMENTS 0225714 6/1987 European Pat. Off. ..... H04L 11/20

OTHER PUBLICATIONS

R. Hazell, editor, "Broadband Technology", *Electrical Communication*, vol. 65, No. 1, (Telecom 91), Oct. 1991, pp. 12–18–Broadband Technology, pp. 19–21–Evolution of Alcatel Exchanges.

K. Y. Eng et al., "A Framework For A National Broadband (ATM/B–ISDN) Network", *International Conference on Communication ICC '90*, vol. 2, Apr. 1990, Atlanta, pp. 515–520.

*Primary Examiner*—Douglas W. Olms
*Assistant Examiner*—Dang Ton
*Attorney, Agent, or Firm*—Werner Ulrich

[57] ABSTRACT

In accordance with the principles of this invention, Pulse Code Modulation (PCM) signal streams are converted into Asynchronous Transfer Mode (ATM) cells for switching and transmission across a telecommunications network. Each cell carries one PCM sample of up to 48 different voice connections, the voice connections selected from the PCM data streams because they have a common destination. The cells are transmitted over ATM virtual circuits, each circuit transmitting one cell every 125 μs. Advantageously, ATM transmission systems interface with PCM systems without adding appreciable delay and without requiring additional buffering. Advantageously, new voice paths can be established most of the time by using available slots in the cells of existing virtual paths.

40 Claims, 14 Drawing Sheets

AM/CBP SYSTEM ARCHITECTURE

ESTABLISHING TELECOMMUNICATIONS CALL PATHS IN BROADBAND COMMUNICATION NETWORKS

CROSS-REFERENCE TO RELATED APPLICATION

This application is related to the applications of:

Thomas L. Hiller, James J. Phelan, and Meyer J. Zola Ser. No. 07/972,787, entitled "Establishing Telecommunications Call Paths Between Clustered Switching Entities";

Thomas L. Hiller, James J. Phelan, and Meyer J. Zola Ser. No. 07/972,786 entitled "Apparatus For Interfacing Between Telecommunications Call Signals And Broadband Signals"; and Thomas L. Hiller, James J. Phelan, and Meyer J. Zola Ser. No. 07/972,788, entitled "Establishing Telecommunications Calls In A Broadband Network" which applications are assigned to the assignee of the present application, and which were filed concurrently therewith on Nov. 6, 1992.

TECHNICAL FIELD

This invention relates to arrangements for establishing digital telecommunications connections, and more specifically, for establishing such connections using broadband networks and switching systems.

Problem

The provision of large quantities of toll telephone service continues to be expensive. While there have been major breakthroughs in the cost of provisioning of high capacity transmission systems using fiber optics, the access to such fiber optic systems and the switching of signals on such fiber optic systems continues to be costly. Further, the cost of switching the signals from one channel to another in a toll tandem switch remains high, with the result that trunk groups are engineered to avoid the use of toll tandem connections as much as possible. (It is estimated that even during a peak busy day, less than 5% of the toll traffic switched through the AT&T network is routed via a tandem switch.) A problem of the prior art is that because large toll networks still rely on the use of expensive toll switches for switching tandem calls as well as toll access calls to the toll network, it is generally advisable to engineer direct groups generously in order to limit the amount of traffic requiring tandem switching in the toll network.

A new standard has been implemented for transmitting combinations of broadband and narrower band, packet and circuit signals over broadband facilities. This standard, the Asynchronous Transfer Mode (ATM) standard, packs data into frames each frame comprising a plurality of cells, each cell being 53 bytes long, 53 bytes consisting of a 5 byte header and a 48 byte payload. When an ATM frame is transmitted, each of the packets may be headed for a separate destination, the destination being identified in the header. No sound proposal has been made for the economic use of ATM for transmitting voice signals from an ingress to a network to a multiplicity of egress nodes of the network. While the ATM standard is finding increasing use in broadband networks, especially those using fiber optic transmission facilities, no economic solution has been found to the problem of designing a communications network for transmitting a large multiplicity of voice signals from any of a multiplicity of ingress nodes of the network to any of a multiplicity of egress nodes of the network using the ATM standard.

Solution

The above problem is solved and an advance is made over the prior art in accordance with our invention wherein a plurality of signals each destined for a common egress switching system or module or group of such systems or modules (node) are packed into a single ATM or ATM-like cell, wherein voice signals are transmitted using such cells transmitted at a repetition rate that is the same or a submultiple of the repetition rate of the pulse code modulation (PCM) signals that represent the voice signals; the cells are transmitted over constant bit rate (CBR) permanent virtual circuits (PVC) between an ingress node and an egress node of the network. Permanent virtual circuits are provisioned as the traffic between a particular ingress and egress node of the network changes, but such circuits need be activated or deactivated only when an additional group (the group size being determined by the number of voice channels that are transmitted in each cell) is needed or can be released. A PVC is provisioned when the data for switching signals of that PVC is stored in some memory of the nodes through which the PVC passes. A PVC is activated when this data is moved into the active storage for switching signals of that PVC and signals are sent through that PVC. In one specific embodiment of the invention, each of 46 or 48 payload bytes of a cell carries a byte of a different PCM channel. For PCM channels that carry more than 64 kilobits/-second, for example, 384 kilobits/second channels, several of the bytes, in the example, 6, of a cell are used for a single channel. Advantageously, using this kind of an arrangement an ATM crossconnect system, also referred to hereinafter as a Common Broadband Platform (CBP), can be used at intermediate nodes to interconnect the links of a permanent virtual circuit between an ingress and an egress node. A unit for carrying out the functions of a CBP is described in *Electrical Engineering*, Vol. 65, No. 1, October 1991, pages 12-18. Such an ATM crossconnect system carries out the functions of systems such as AT&T's Digital Access Crossconnect System (DACS) systems, on ATM signals, and is therefore very much simpler than a toll switch. Advantageously, since the permanent virtual paths connect an ingress switch to an egress switch, call control signals need only be sent between these two switches, and need not be sent to intermediate switches when a PVC is already activated. Activation of a PVC may require notification of intermediate CBPs if these CBPs do not already have the PVC control data in active memory. Advantageously, such ATM crossconnect systems can be interconnected using broadband transmission facilities.

Advantageously, the rate of activation and deactivation of PVCs in response to changes in traffic patterns is sufficiently low so that these ATM crossconnect systems can readily establish and tear down virtual circuit links as needed to meet traffic changes. When there are no traffic changes, i.e., when the level of traffic between different ones of the ingress and egress nodes are not changing sufficiently to require the addition of a permanent virtual path between two of the nodes and a corresponding subtraction of other permanent virtual paths, the digital crossconnect systems performs a simple function. The function is that of routing a cell of each time frame, 125 microseconds (μs), on an input link to the designated output link for each such cell. This is the fundamental function of an ATM crossconnect system. Further, the rate of change of provisioned PVCs is especially low, requiring only very long response times to a request for provisioning additional inactive PVCs.

GENERAL DESCRIPTION

This General Description first presents an overview of all of the diagrams and is followed by a detailed description of special characteristics of elements of these diagrams for implementing applicants' invention.

Figure 1:
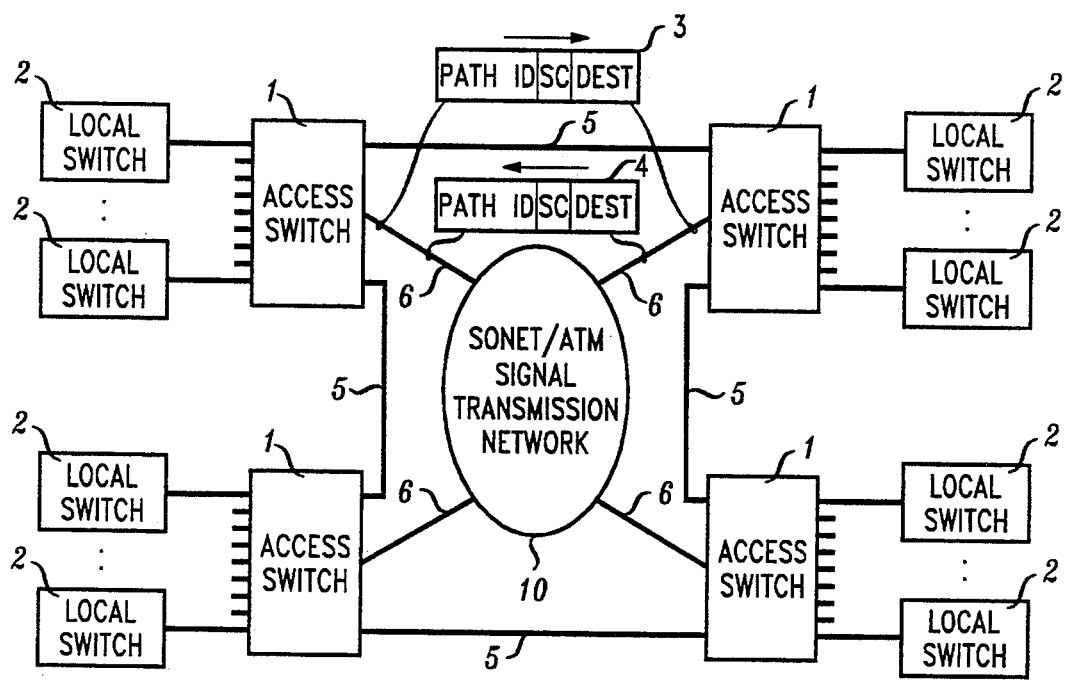
FIG. 1 is a block diagram showing a network of interconnected access switching networks.

FIG. 1 is a block diagram showing a plurality of interconnected access switching systems of a network. A group of access switches 1 access a common crossconnect network 10 in accordance with the principles of this invention. A crossconnect network is an ATM crossconnect network comprising a plurality of interconnected ATM crossconnect nodes. Each ATM crossconnect node has the ability to switch each incoming cell on any incoming line to any outgoing line. Constant bit rate (CBR) cells are used to carry PCM voice traffic, and variable bit rate (VBR) cells are used to carry packetized data. Much of the traffic carded through the ATM crossconnect network when used as a toll network is CBR traffic wherein the individual CBR cells in each 125 μs frame are switched to a destination. An ATM crossconnect node can be used for a Common Broadband Platform (CBP) because of the provision of PVCs and the relatively low rate of activation and deactivation of these PVCs. The routing pattern for a particular permanent virtual circuit (PVC) does not change as long as the PVC is provisioned; the CBR can route according to a PVC as long as that PVC remains active. The dynamic portion of the switching of the ATM nodes is primarily associated with the switching of VBR cells whose headers may be different with each 125 μs frame and which must be switched accordingly.

The term PCM as used herein refers both to voice signals transmitted by PCM and to data (including FAX and video) transmitted over PCM channels.

Node as defined herein is the entity which gathers outgoing traffic and which distributes incoming traffic. The Asynchronous Transfer Mode Interface Unit (ATMU), described further below, is one example of such a node, which may distribute traffic to a plurality of switch modules of one or more 5ESS® switches or which may distribute traffic to one or more stand-alone switches. The node is the access to a network for interconnecting such nodes or is an intermediate switch point in such a network.

FIG. 1 shows the exchange of messages required to complete the selection of a CBR PVC channel. The ingress node signals to the egress node (message 3) the identity of the source and destination parties, and the identification of the PVC. The destination node returns with an acknowledgment (message 4) properly identifying the path.

FIG. 1 also shows links directly interconnecting the access switches. The access switches are interconnected by interaccess switch links 5 which carry SONET-/ATM signals and are connected to a central SONET-/ATM signal transmission network 10 by SONET-/ATM access links 6. The term SONET (Synchronous Optical Network) is used herein to refer to either or both of the U.S. standard (SONET) or the European standard SDH (Synchronous Digital Hierarchy). SONET/ATM means SONET or SDH signals used to transport ATM cells.

Figure 2:
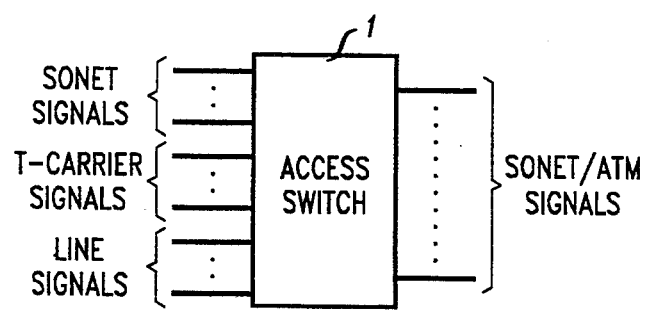
FIG. 2 illustrates the connections to the access switches of such a network.

The access switches themselves are accessed by a plurality of local switches and, as indicated in FIG. 2, the local switches are connected to the access switches through digital facilities, such as the U.S. 24 channel conventional T carrier facilities or the European 32 channel systems for carrying PCM signals, which signals are converted in the access switches to CBR cells of ATM signals. When the digital facilities themselves carry packetized data, then this packetized data is processed by a Packet Switch Unit within an SM, sent via the TSIU of that SM to the ATMU where it is converted to VBR ATM cells and transmitted over VBR PVCs to the CBP. In addition, signaling channels are treated as CBR or VBR channels and are transported, accordingly, in CBR cell channels or single channel VBR cells of the type described below. Significantly, by transporting signaling channels through the ATM network, the necessity for a separate signaling network, using Signal Transfer Points (STP), is avoided.

Figure 3:
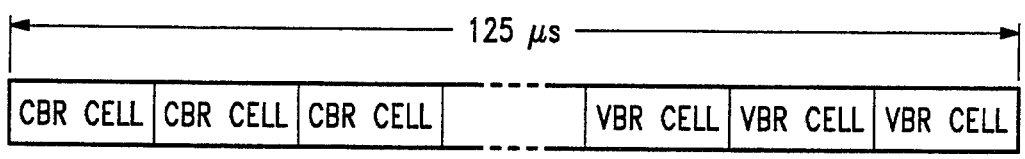
FIG. 3 illustrates one 125 μs frame of ATM cells (a glossary of abbreviations is found at the end of the Detailed Description); the constant bit rate (CBR) cells carrying voice channels are sent every 125 μs.
Figure 8:
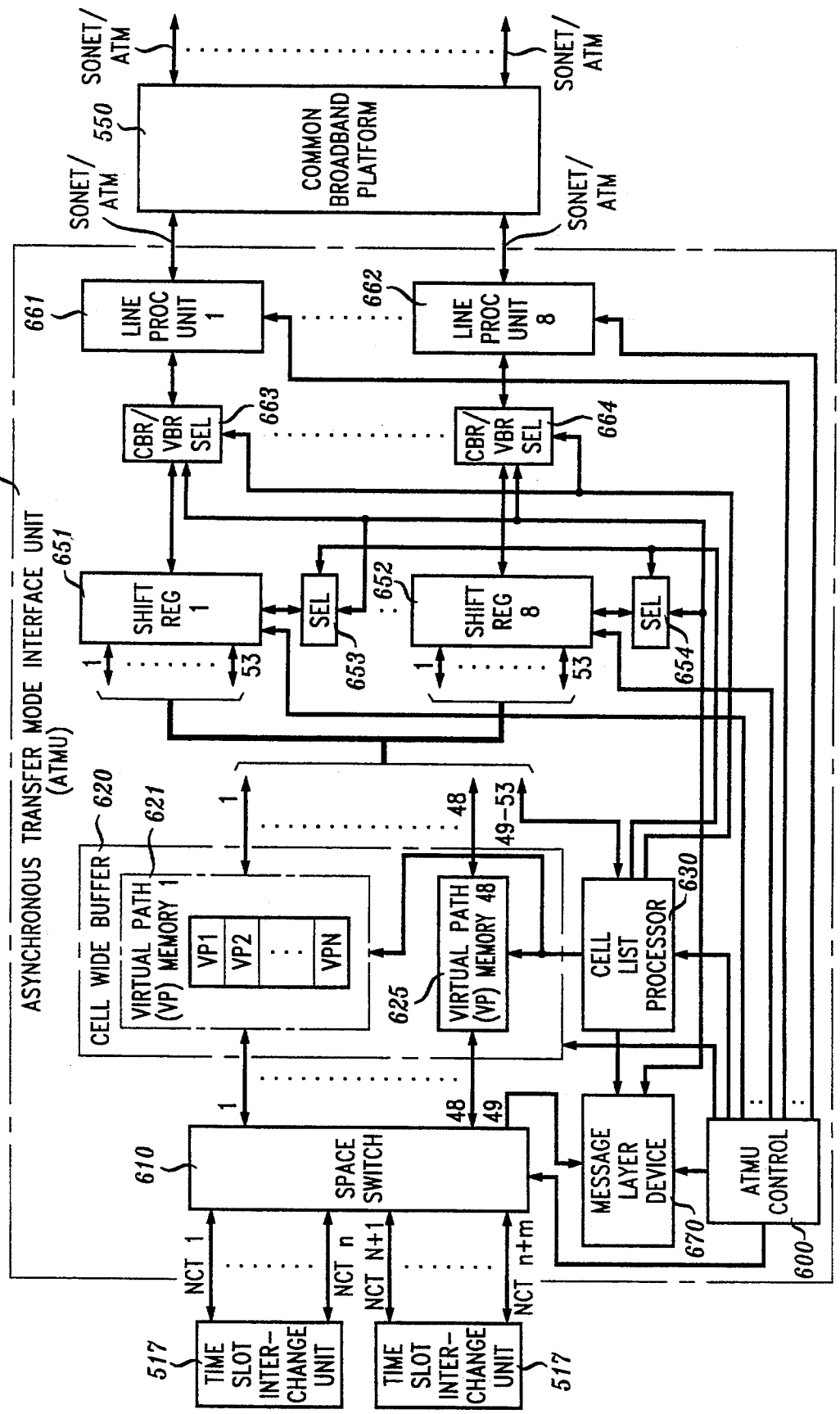
FIG. 8 is a block diagram of an Asynchronous Transfer Mode Interface Unit (ATMU) for interfacing between PCM signals and ATM signals.

FIG. 3 illustrates one 125 μs frame of a typical ATM signal that appears at the output of an Asynchronous Transfer Mode Interface Unit (ATMU) (FIG. 8). A 125 μs frame consists of a number of CBR cells and a number of VBR cells. For convenience, these are shown as being grouped at the beginning and end of each frame, but it is also possible to intersperse VBR cells among groups of CBR cells. The advantage of grouping the CBR cells in this manner is that priority of CBR cells can be assured and the design of the cell list processor (FIG. 11, block 630) is simplified. Signals coming into an ATMU are interspersed CBR and VBR cells. CBR cells are transmitted from a common broadband platform (CBP) (block 550, FIG. 8) as soon after they are received as possible, thus giving them priority over VBR cells; the output of a CBP connected to an ATMU therefore has CBR and VBR cells interspersed.

Figure 4:
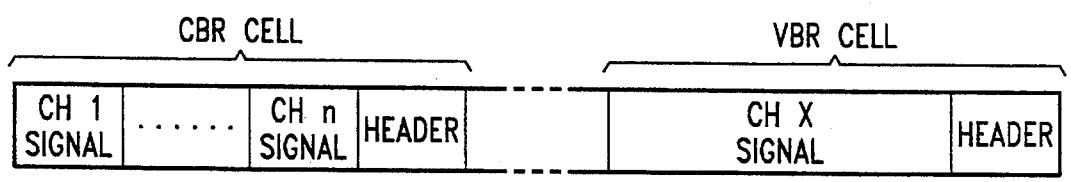
FIG. 4 illustrates an ATM segment including a CBR cell and a variable bit rate (VBR) cell.

FIG. 4 illustrates the content of a CBR cell and a VBR cell. The content of a CBR cell includes signals for a plurality of channels. Since an ATM cell comprises a 5 byte header and a 48 byte payload, one attractive arrangement is to have the 5 byte header identify the particular permanent virtual circuit represented by the CBR cell, and to have the CBR cell contain the individual bytes (PCM samples) of 48 voice channels (DS0 signals).

Alternatively, 46 DS0s are carried and a two byte index is used to identify which group of 46 DS0s on a given virtual path is carried in a particular cell. In this alternative, a plurality of ATM cells for one virtual path are transmitted every 125 μs, but cells with a particular index are sent only once every 125 μs. The alternative arrangement serves to decrease the number of virtual paths a network must support.

The VBR cell illustrated in FIG. 4 comprises a header and a payload, wherein the payload is associated with a single channel and a single destination in accordance with CCITT standards for ATM. In effect, a VBR cell represents part of a packet of data being transmitted from a source access switch to a destination access switch of the toll network.

It is, of course, also possible to have a CBR cell all of whose entire contents are devoted to a single communication, if the communication is a communication such as the 1.5 megabit/sec. signal required for a compressed television signal. For broadband signals, such as High Definition TV (HDTV) signals, it is more convenient to connect these signals directly to the CBP. Based on the use selected for the CBR PVC as selected by the originating access switch, the payload in each cell is used as selected, with the same disposition being made for all cells transmitted over the CBR PVC for the duration of the existence of that PVC.

Figure 5:
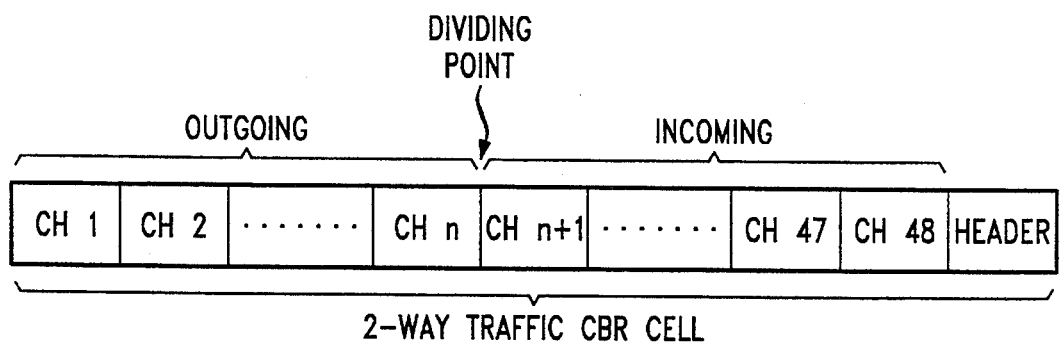
FIG. 5 illustrates a CBR cell for carrying two-way traffic.

FIG. 5 illustrates one CBR cell carrying two-way traffic, the first n bytes carry up to n channels of outgoing traffic, and bytes (n plus 1) to 48, carry up to (48 minus n) channels of incoming traffic. Since an egress node assigns a channel, the bytes for outgoing traffic are seized by one node, those for incoming traffic by the other node. Since assignment of idle channels is upward from I for outgoing traffic and downward from 48 for incoming traffic, if many fewer than all of the channels are active then it will generally be possible to move the dividing point, set in this case between channel n and channel n plus I in the direction of additional requests for channels. The two-way traffic CBR cells are particularly useful for carrying traffic between a source and a destination when there is relatively little such traffic being offered.

Figure 6:
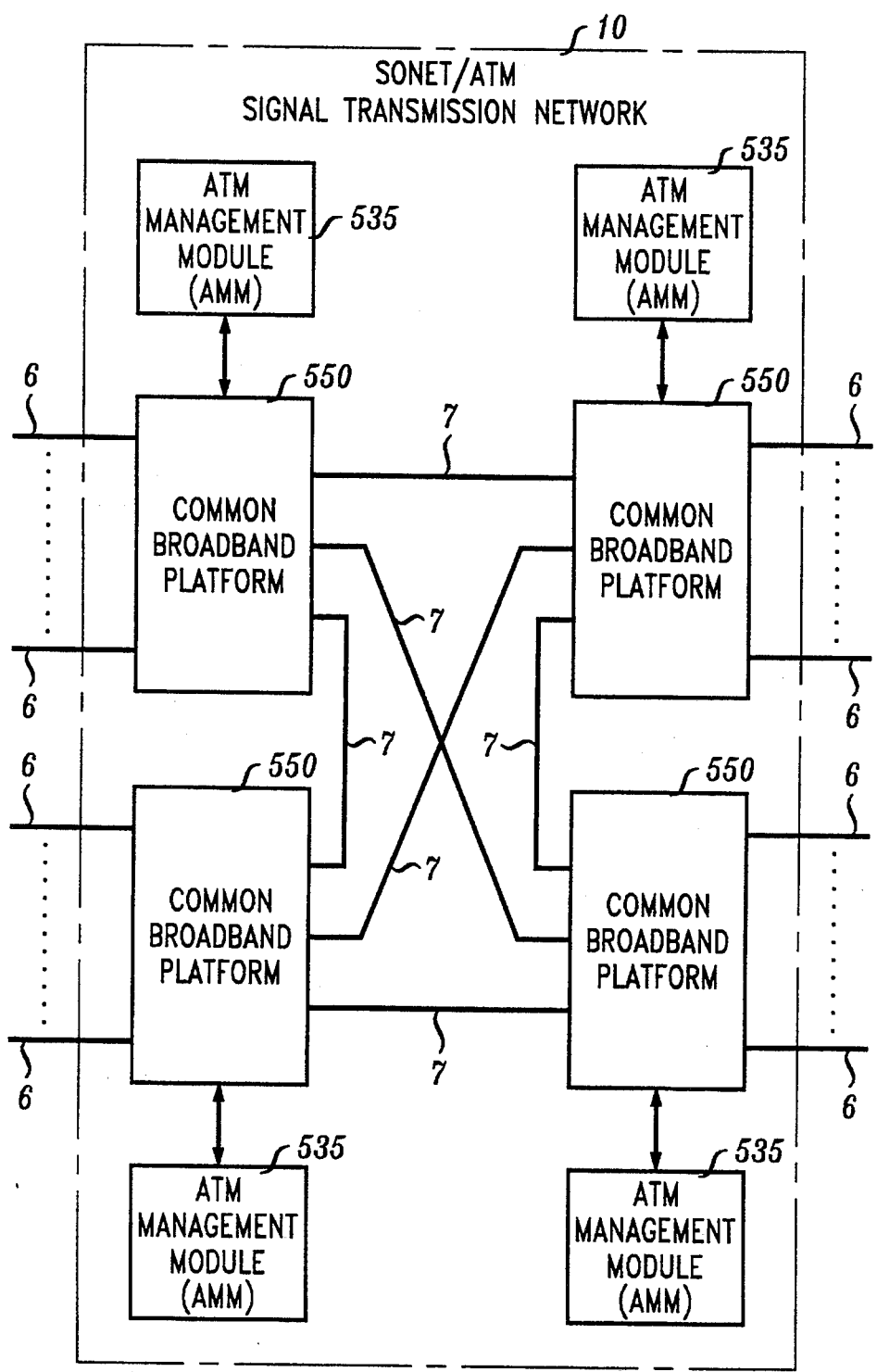
FIG. 6 illustrates the Synchronous Optical Network (SONET)/ATM signal transmission network of FIG. 1.

FIG. 6 shows the composition of the SONET/ATM signal transmission network. This network comprises a group of CBPs 550 interconnected partly or fully by inter-CBP SONET/ATM links. Each CBP has an associated ATM management module (AMM) 535 for recording and controlling the virtual connections established within the connected CBP. Each of the CBPs 550 in network 10 perform only a crossconnect function carried out under the control of the connected AMM. The CBPs 550 are connected to access switches 1 by access links 6.

In order to take full advantage of the desirable attributes of the real time network routing arrangement, it may be desirable to provision virtual circuits as 1- or 2-link virtual circuits, one or both of whose links may require the use of a permanently assigned intermediate CBP. This simplifies the process of selecting a near optimum provisioned circuit for activation when this becomes necessary, although the provisioning of active circuits may not be optimum.

Figure 7:
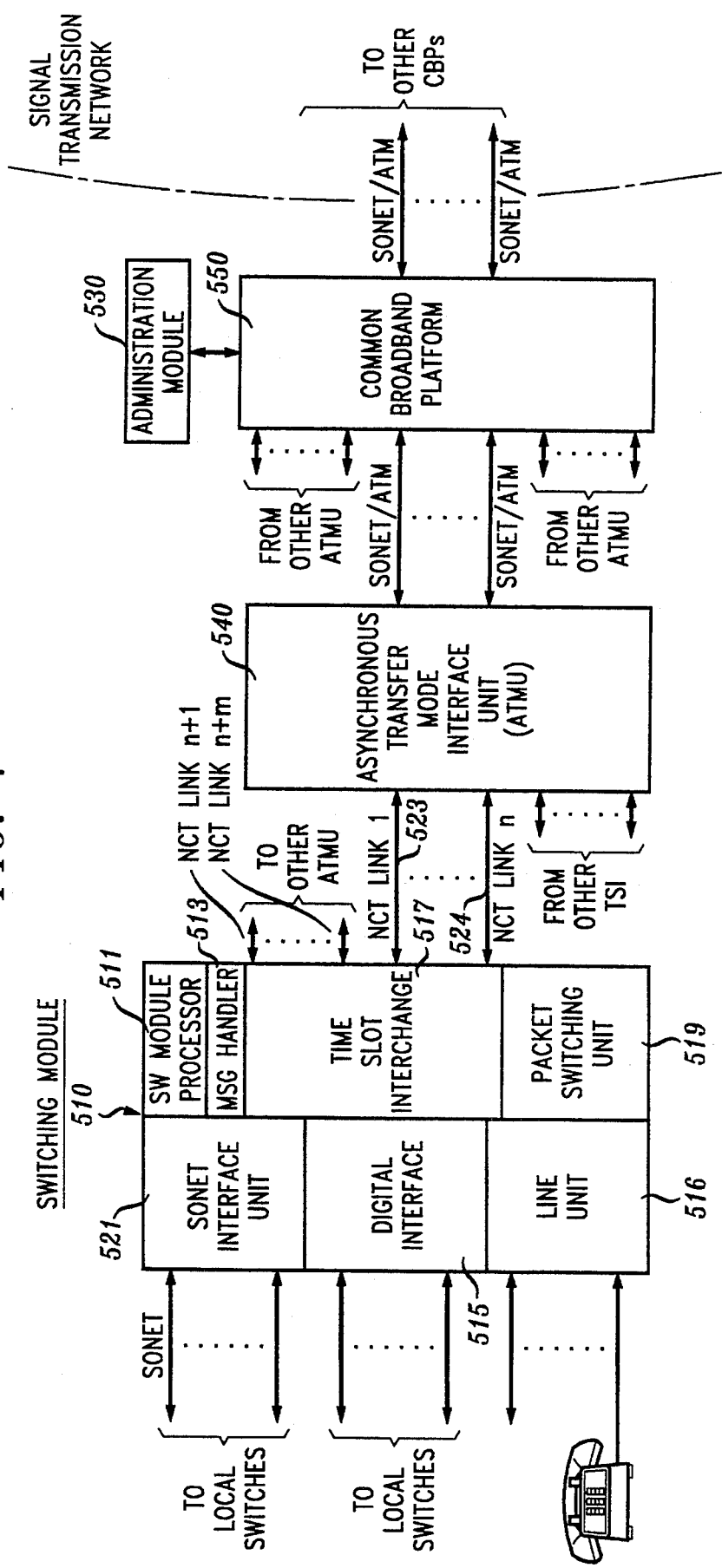
FIG. 7 is a block diagram of an access switch of FIG. 1.

FIG. 7 is a block diagram of an access switch 1. The 5ESS ® switch, manufactured by AT&T, and extensively described in *AT&T Technical Journal*, Vol. 64, No. 6, Part 2, July-August 1985, pages 1303–1564, is the switch described for use with applicants' invention. It includes a plurality of switching modules. The input from the local switches 2 (FIG. 1) are terminated on switching module 510. This switching module comprises both circuit and packet switching units, such a module is described in M. W. Beckner, J. A. Davis, E. J. Gausmann, T. L. Hiller, P. D. Olson and G. A. VanDine: "Integrated Packet Switching and Circuit Switching System", U.S. Pat. No. 4,592,048. This module is controlled by a switching module processor 511 which communicates with a message handler 513 for receiving and transmitting messages. The T-carrier inputs from local switches 2 are terminated on digital interface 515 and are switched by time slot interchange 517. Since the signals arriving at the digital interface also contain packet switched signals (for example, signals from the D-channels of Integrated Services Digital Network (ISDN) sources) a packet switching unit 519 is also provided. The outputs of this packet switching unit are sent to the time slot interchange unit for further switching onto output digital links of the SM 510. In addition, a SONET interface unit 521 is provided for interfacing with PCM signals carried over SONET facilities from the local switches. The outputs of the switching module 510 are a group of network control and timing links (NCT 523, . . . , 524) (typically, up to 20). The NCT link signals are carried over optic fiber links and can readily be made long enough to allow a SM to be remotely located. A subgroup of these 20 links is then terminated in an Asynchronous Transfer Mode interface Unit, (ATMU) 540. Other subgroups are connected to other ATMUs, the latter also being connected to CBP 550. The output of the ATMU is a plurality of SONET/ATM signals to the common broadband platform (CBP) 550. The AMM, an extension of the administrative module (AM) 530, is used to control switching connections in the common broadband platform 550 and to carry out common functions for a plurality of switching modules connected to a particular common broadband platform (CBP) 550. The CBP is also used to switch signals between different switching modules 510 connected to CBP 550 in order to handle tandem calls between local switches 2 that are not connected to a common switch module.

FIG. 7 shows a configuration wherein the ATMU can be separated physically from both the CBP and the SM; both the NCT link and the SONET/ATM link are arranged to transmit signals over longer distances. Clearly, if the ATMU abuts or is part of either the SM or the CBR, these facilities can be simplified.

As an ATM crossconnect unit, the CBP is able to perform the function of connecting ATM cells between ATM inlets and ATM outlets. To ensure that the composite CBR cells that carry voice traffic are not delayed or lost, the CBR cells are given high priority. They are sent on facilities that are selected to have sufficient bandwidth to support their transport, and buffering is always able to accommodate these cells. Simulations have demonstrated that the probability of a delay across a CBP in excess of 50 μs for a CBR cell, even when facilities are fully loaded, is less that $1 \times 10^{-11}$. Narrowband VBR signaling and other priority cells are guaranteed transport via margins of bandwidth in the facilities that are reserved for this purpose. Those VBR cells use buffers that are separate from the CBR cells, even though they are on the same facility. Broadband connections use separate facilities coming directly into the CBP. These broadband signals use different buffers in the CBP that are separate from the narrowband CBR and VBR buffers.

The CBP is connectable to a network, as illustrated in FIG. 1, or can simply be used to interconnect a group of ATMUs and their connected SMs to form a single giant switching system or switching system cluster, the giant system or cluster being connected to other switching systems via a network connected to the SMs. During a transitional period, the existing time multiplexed switch (described in the *AT&T Technical Journal* reference, for example, on pages 1425-1426) can continue to carry part of the inter-SM traffic and the ATMUs and CBP can carry the rest.

While in this specific embodiment, the inputs to ATMUs are from a group of switching modules of a single switching system, such as the modules of a 5ESS switch, the teachings of applicants' invention are equally applicable if separate switching systems, instead of switching modules, are connected to ATMUs.

FIG. 8 is a block diagram of an asynchronous transfer mode interface unit (ATMU) 540. The ATMU is under the overall control of an ATMU Central Controller (ATMU CC). The inputs are from a time slot interchange unit 517 of one or more switching modules 510. The outputs are to the common broadband platform (CBP) 550. The ATMU is considered an ingress and egress node of the network, and a PVC interconnects two ATMUs. This allows traffic from several SMs to be collected for transmission over one PVC from one ATMU to one ATMU. The outputs of time slot interchange units 517, which are groups of NCT links, enter space switch 610 which has 48 outputs leading to cell wide buffer 620 (CWB). Each NCT link carries 512 16-bit time slots every 125 μs. The 16 bits include 8 PCM or user data bits, 7 internal control bits, and one parity bit. All but the 8 PCM bits are discarded before an ATM cell is formed. CWB 620 includes 48 separate byte-organized memories whose outputs can then be used in parallel to form the 48-byte payload of an ATM cell. The space switch is used to switch the outputs of the NCT links to the appropriate one of the 48 virtual path memories 621, . . . , 625. The 48-byte parallel output and a 5-byte output, representing a header, from the cell list processor 630 enter one of 8 shift registers 651, . . . , 652. The particular shift is selected by one of the select units 653, . . . , 654 under the control of cell list processor 630. The output of each of these shift registers goes via one of the CBR/VBR selectors 663, . . . , 664 to a Line Processing Unit 661, . . . , 662 (LPU), each LPU generates a SONET/ATM data stream. These 8 data streams are then switched in common broadband platform (CBP) 550. The term CBP as used herein refers to an ATM crossconnect switch, having, in this case, ATM/SONET inputs and outputs. The treatment of VBR cells is discussed further below. Details of the treatment of packets for VBR cells are provided in Section 4.4 of the Detailed Description.

The number of NCT links which can be terminated on one space switch is limited by the speed of the CWB memories and the CLP. If several SMs are terminated on one ATMU it is desirable to maximize the quantity; in the preferred embodiment 20 NCT links are used, but a larger number, such as 60, appears feasible with present technology.

Figure 9:
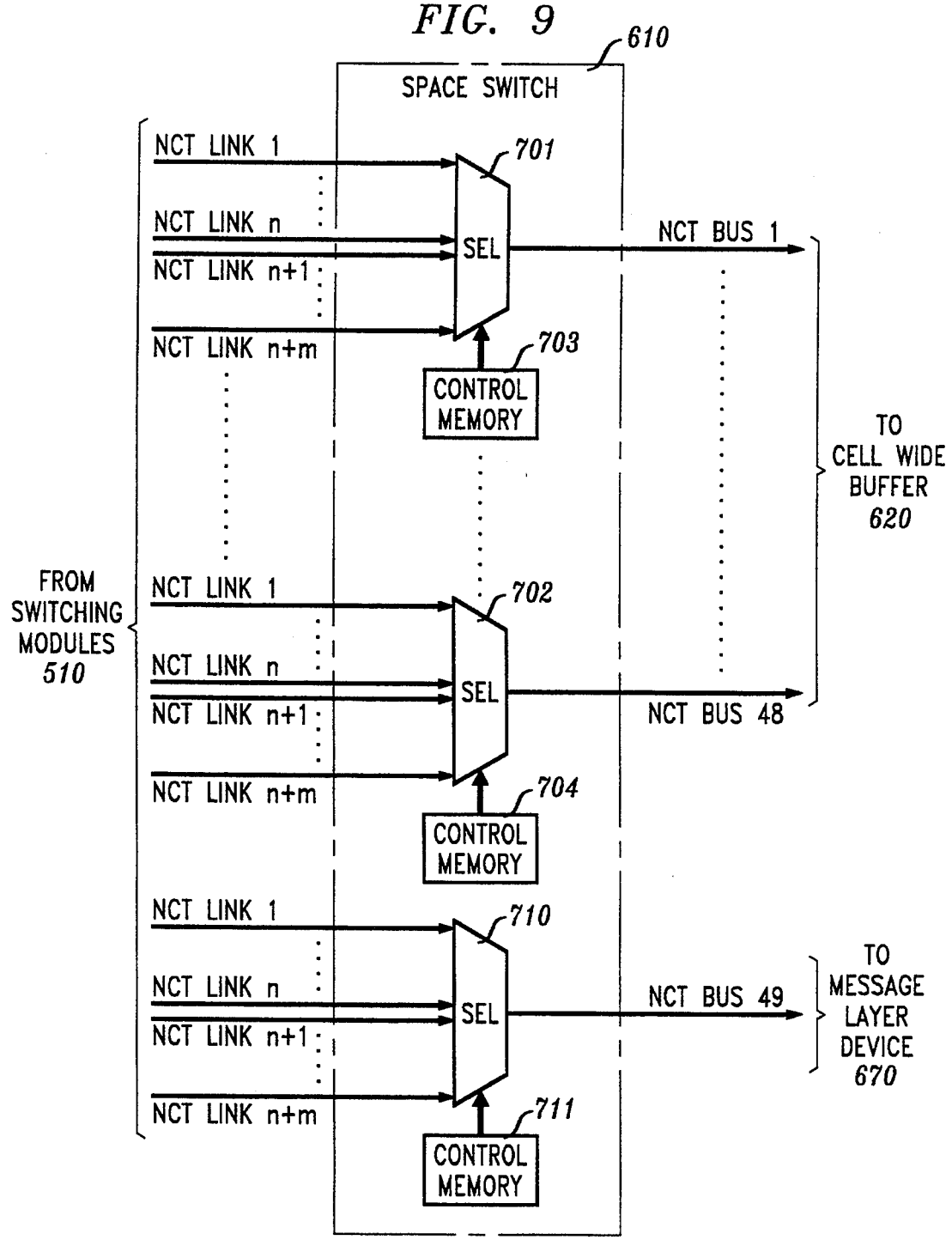
FIGS. 9-13 illustrate various blocks of the ATMU.

FIG. 9 illustrates the space switch 610. 48 selectors 701, . . . , 702, each controlled by a control memory 703, . . . , 704 are used to switch the outputs of the incoming NCT links to the appropriate one of the 48 virtual path memories that form a cell wide buffer. Each byte in each of the NCT links may go to any one of the 48 positions in the cell wide buffer. In addition, selector 710, under the control of control memory 711, is used to steer (packetized) variable bit rate data including signaling and other messages to Message Layer Device 670 (MLD) (FIG. 8). The MLD converts messages into ATM cells which are transmitted by the cell list processor 630 a CBR/VBR selector 663, . . . , 664 into one of the LPUs 661, . . . , 662 into the CBP after the CBR cells have been transmitted for a given 125 μs.

Figure 10:
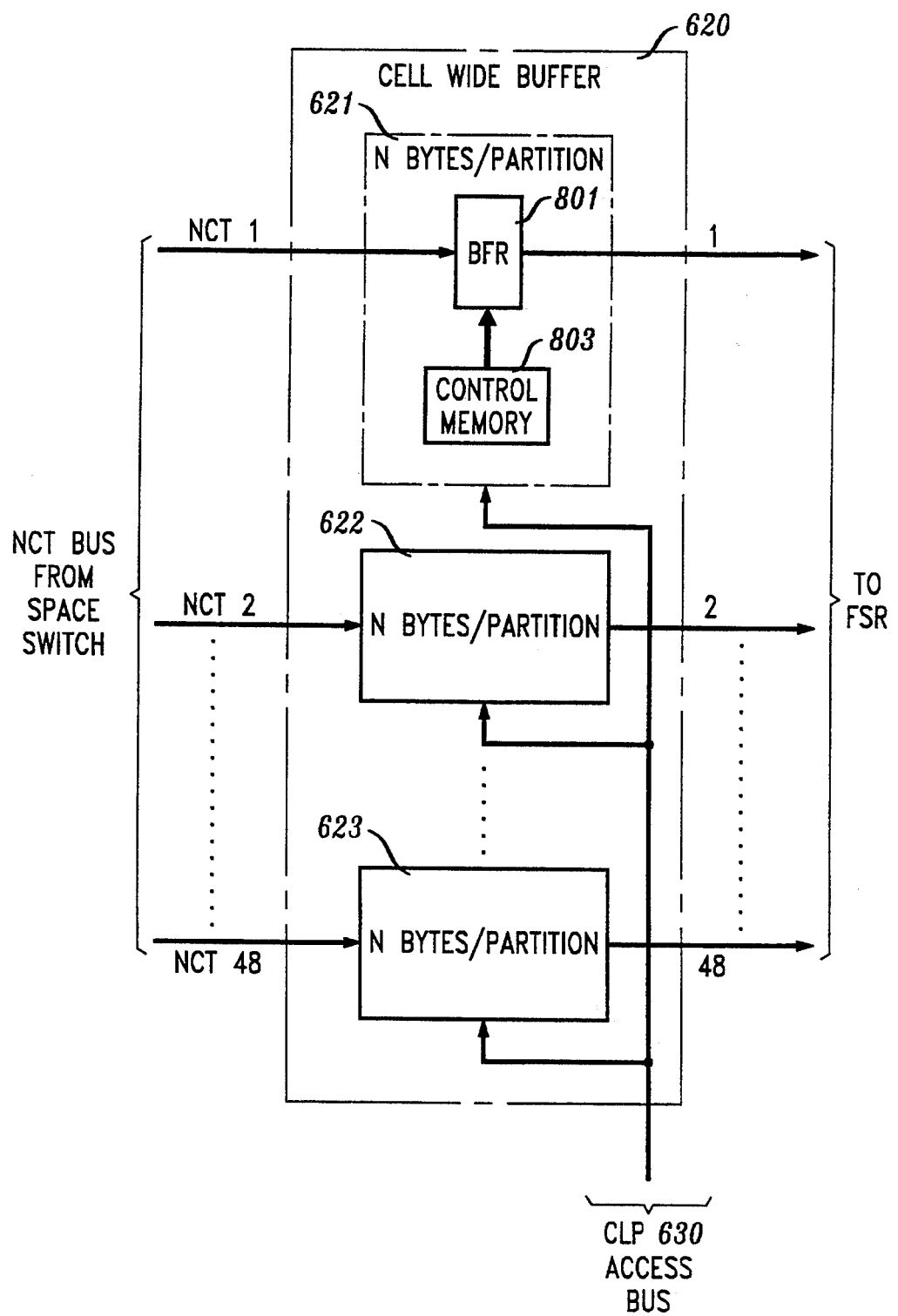

FIG. 10 illustrates the cell wide buffer 620. It comprises 48 8-byte memories, 48 units, 621, 622 . . . 623 each comprising an 8-bit by N byte buffer 801 and a control memory 802, where N represents the depth (i.e., number of cells that can be stored) of the buffer. In accordance with well-known principles of the prior art, in order to preserve frame integrity, the transmit cell wide buffer is a duplex buffer, one part being loaded while the other is unloaded; the receive cell wide buffer is triplex to solve jitter and frame integrity problems. The control memory steers bytes from the incoming NCT bus to the appropriate position in the buffer. In addition, the system is arranged to transmit a pseudo random code to test continuity of DS0 channels over ATM facilities; in one embodiment, the control memory of a CWB is arranged to insert and to detect the presence of the code under the control of the ATMU CC. Alternatively, tones from tone sources in the SM can be transmitted over DS0 channels and detected at the far end.

Figure 11:
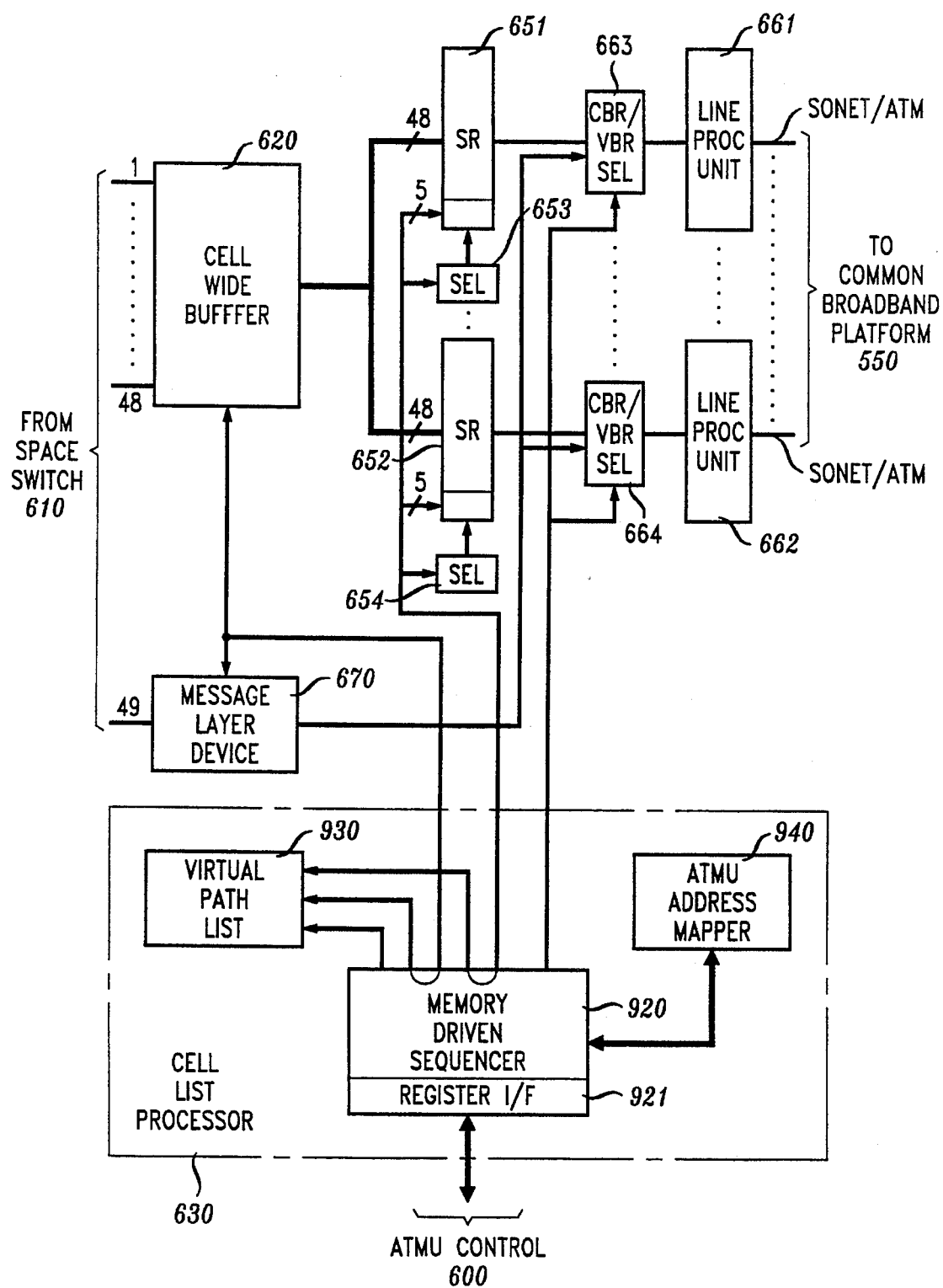

FIG. 11 illustrates the Cell List Processor (CLP) 630, Facility Shift Register (FSR) 651, and Line Processor Unit (LPU) 661. The CLP 630 simultaneously reads the CWB 620 while controlling the Selector 653. This causes one 48 byte CBR cell to be written into the SR 651. In addition, the CLP outputs the 5 byte header into the SR at the same time. Thus a full 53 byte cell is loaded into the SR. The cell is now shifted into the LPU 661 via CBR/VBR selector 663. The LPU 661 transmits the cell onto the SONET facility to the CBP.

Figure 12:
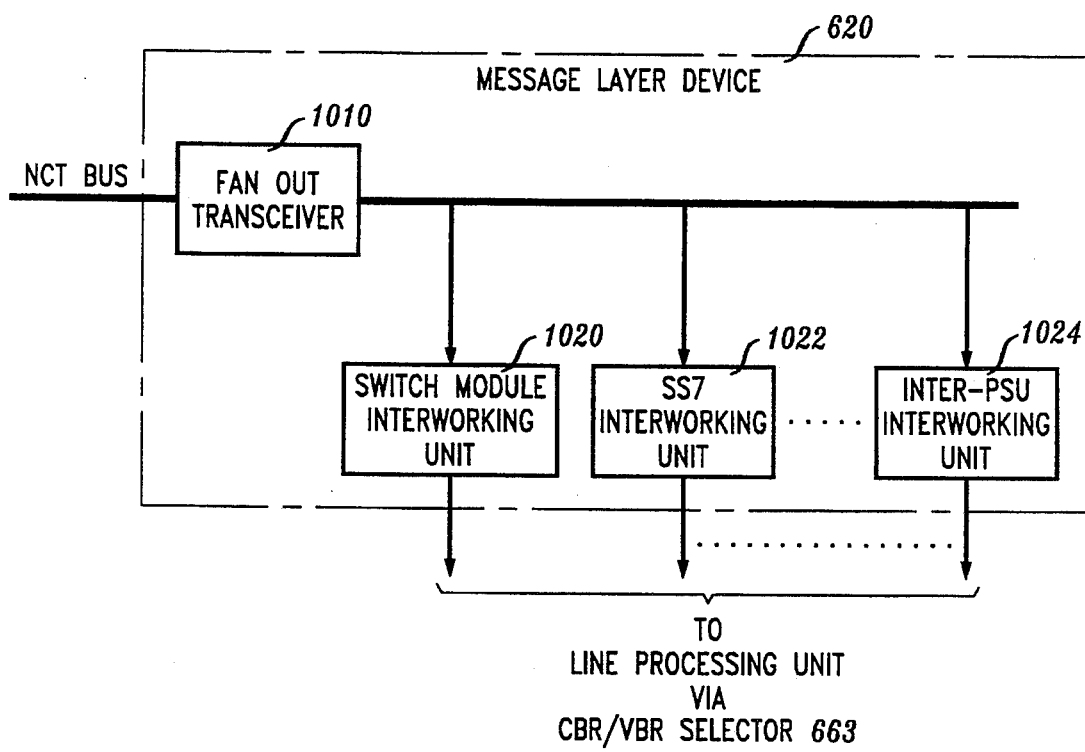

FIG. 12 shows the Message Layer Device 620. The MLD 620 receives messages on NCT time slots from the Space Switch 610 into Interworking Units 1020, 1022, . . . , 1024. These messages could be inter-SM messages, SS7 messages, or user generated messages such as CCITT X.25 messages. The IWUs determine the correct pre-provisional ATM Virtual Circuits identifier, and segments the message into ATM cells per CCITT specifications using the determined VC identifier and other header fields as described by CCITT ATM Adaptation Layer specifications. These cells are subsequently shifted out of the Interworking Unit into the CBR/VBR selector and LPU 661 shown in FIG. 11, under the control of the CLP. In the preferred embodiment, the outputs are joined and sent to one or more of the CBR/VBR selectors.

Figure 13:
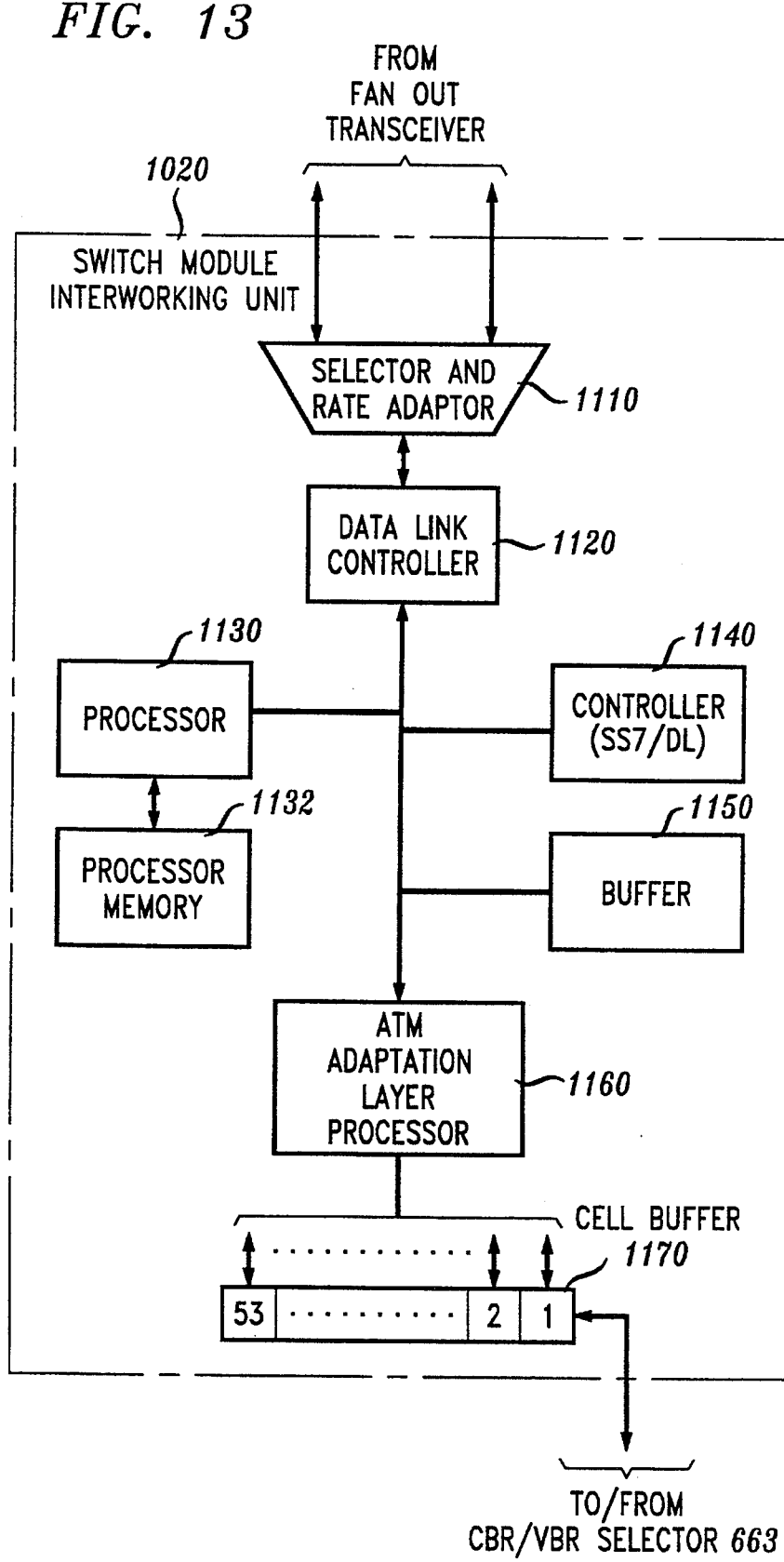

FIG. 13 shows an Interworking Unit 1020. NCT time slots are connected via the selector 1110 to the data link controller 1120. A Data Link Controller 1120 processes bit level protocol that includes flags, bit insertion, and CRC. A second controller 1140 processes SS7 or link access protocol within the messages. A processor 1130 determines the Virtual Circuit to be used for the message, and commands the ATM Adaptation Layer (AAL) Processor 1160 to segment the message into ATM cells. The ATM cells are placed, under the control of AALP 1160, into the Cell Buffer 1170 (not to be confused with Cell Wide Buffer 620) (FIG. 8) where they are later transmitted under control of the CLP 630 (FIG. 11) into the CBR/VBR selector 663 (FIG. 11). High priority cells are inserted into Cell Buffer 1170 before low priority cells. Cells from the cell buffer 1170 (FIG. 13) constitute the VBR cells shown in FIG. 3 (the 125 μs frame). The cell buffer may have to be several cells deep to take care of VBR cell bunching from the CBP.

Figure 14:
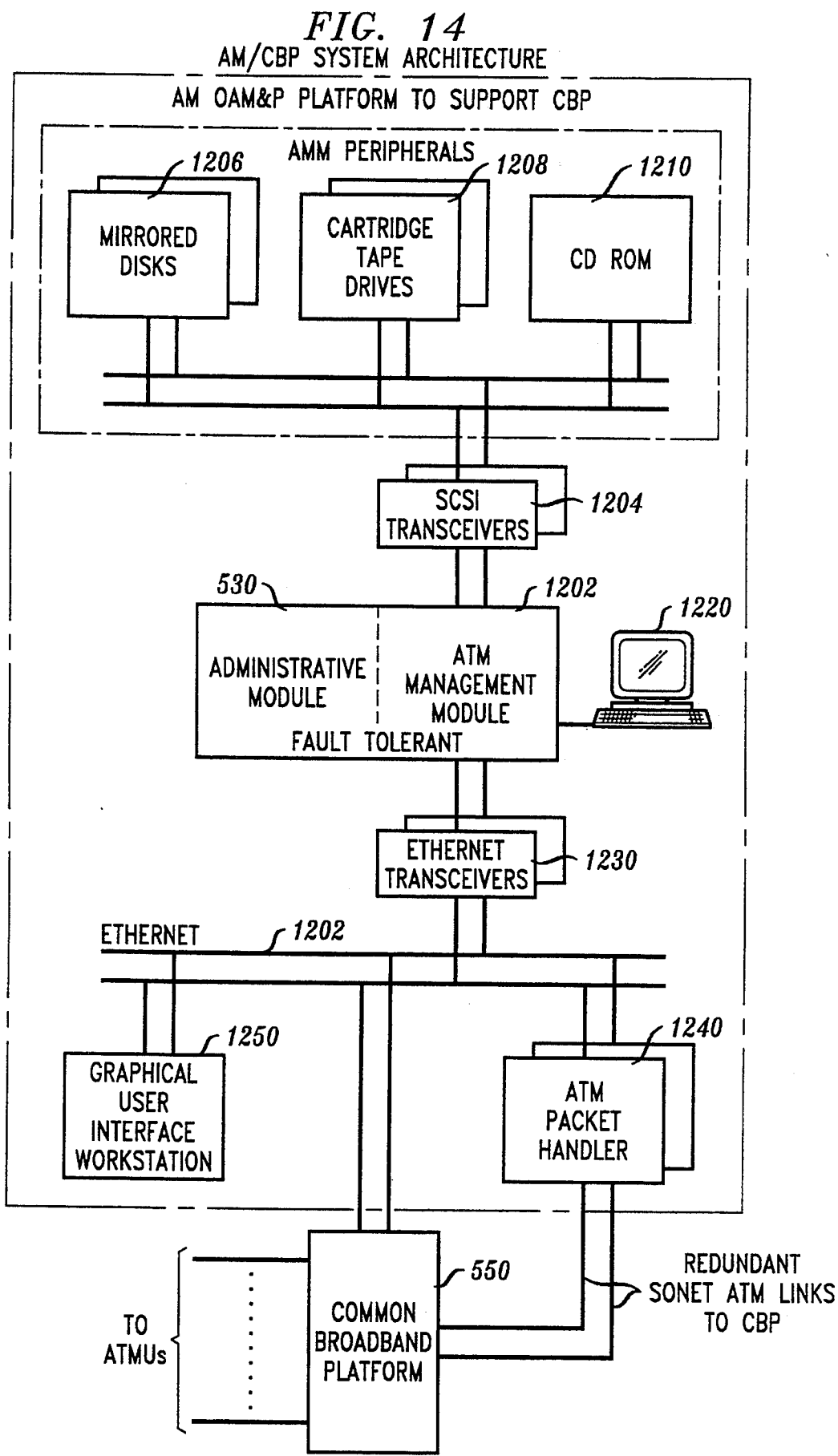
FIG. 14 illustrates the control complex of a common broadband platform (CBP) unit for switching ATM cells.

The AM serves to support the entire 5ESS switch and CBP (including ATMUs) OAMP needs. These include download and control of the CBP, craft graphical display, and communication via ATM with SMs. FIG. 14 shows the AM/CBP system architecture as comprising the following components:

- ATM Management Module (AMM) including directly connected terminal. This is an adjunct fault tolerant processor that connects to the existing 5ESS switch AM, and serves to provided added processing throughput for new CBP and ATMU capabilities.
- Ethernet® Bus to interconnect AM/AMM with Graphical User Interface (GUI), ATM Packet Handler (APH), and CBP.
- Small Computer System Interface (SCSI, an industry standard) peripherals for disk, tape, and CD ROM on-line documentation: These augment the existing AM non-volatile peripherals.
- GUI workstation terminals that supports existing 5ESS switch equipment, CBP, and ATMUs.
- ATM Packet Handler provides the AM/AMM with the ability to communicate via ATM over SONET to the SMs. The SMs terminate the APH's ATM in their ATMU WILDs. To communicate with SMs, the AM/AMM sends messages via Ethernet to the APH which performs the message to cell conversion and transmittal to CBP over SONET.

The GUI and non-volatile memory are commercial components whose control resides in AMM software. The design of the AMM and APH components are expanded in Section 5 of the Detailed Description.

Figure 15:
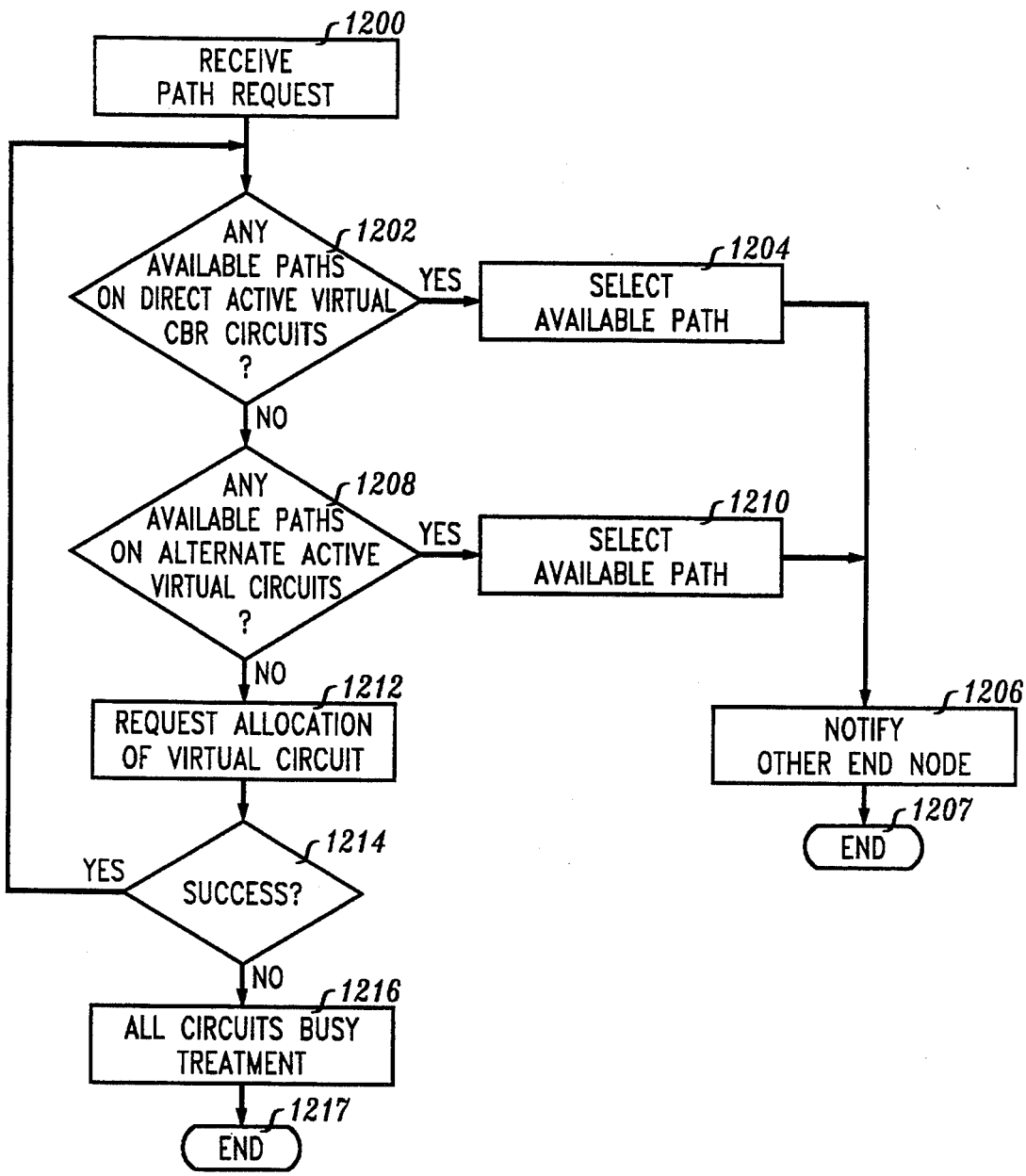
FIGS. 15-17 are flow diagrams illustrating the processes of selecting a channel for a communication activating permanent virtual circuits and combining traffic of partially loaded permanent virtual circuits.

FIG. 15 illustrates the path hunt which is performed by a switching module processor 511, or other processor having data about the status of PVCs from the connected ATMU to the destination of the call. This processor receives a path request (action block 1200) and determines (test 1202) if there are any available paths (channels) on direct active virtual CBR circuits to the destination of the path request. If so, then an available path is selected (action block 1204) and a message is sent to the node (typically, a processor for another ATMU) at the other end to notify that node that a path has been established on a particular slot of a particular active CBR PVC.

If no available paths on direct active CBR PVCs are found in test 1202, then test 1202 is used to determine if there are any available paths on alternate active CBR PVCs. If so, then an available path from one of these alternate active virtual circuits is selected (action block 1210) and the node at the other end is notified (action block 1206). (An alternate active virtual circuit is an active virtual circuit using an alternate route which is a route that uses at least two links instead of the single link direct route.) If no paths are available on active virtual circuits for this path request, then a request is made to allocate an additional virtual circuit (action block 1212). This request is sent to the administration module 530 (FIG. 7) which activates an additional virtual circuit as described in FIG. 16. Eventually, the administrative module responds to SMP 511 with a success or failure indication and, in the case of a success indication, the identity of the allocated virtual circuit. Test 1214 is used to determine that success or failure. If the allocation request has been successfully responded to (positive output of test 1214), then test 1202 is reentered in order to perform the process of selecting an available path. If the allocation process was unsuccessful (negative output of test 1214) then an all circuits busy treatment is given to the call for which the path request was originally received in block 1200.

It is assumed in this discussion that the controlling processor, such as the switching module processor maintains a list of active CBR virtual circuits for carrying traffic outgoing from its associated switching module and maintains an activity state for each channel of such a virtual circuit. It is, of course, also possible to maintain this information elsewhere such as in the administrative module, but the suggested arrangement minimizes the time required for establishing most calls. Further, it is possible to use virtual CBR circuits with two-way channels but such an arrangement, while it allows for more efficient use of the virtual channels, requires negotiation between the two endpoints in order to prevent "glare" (i.e., a situation wherein the same channel is seized concurrently by the two end nodes connected to the channel).

Figure 16:
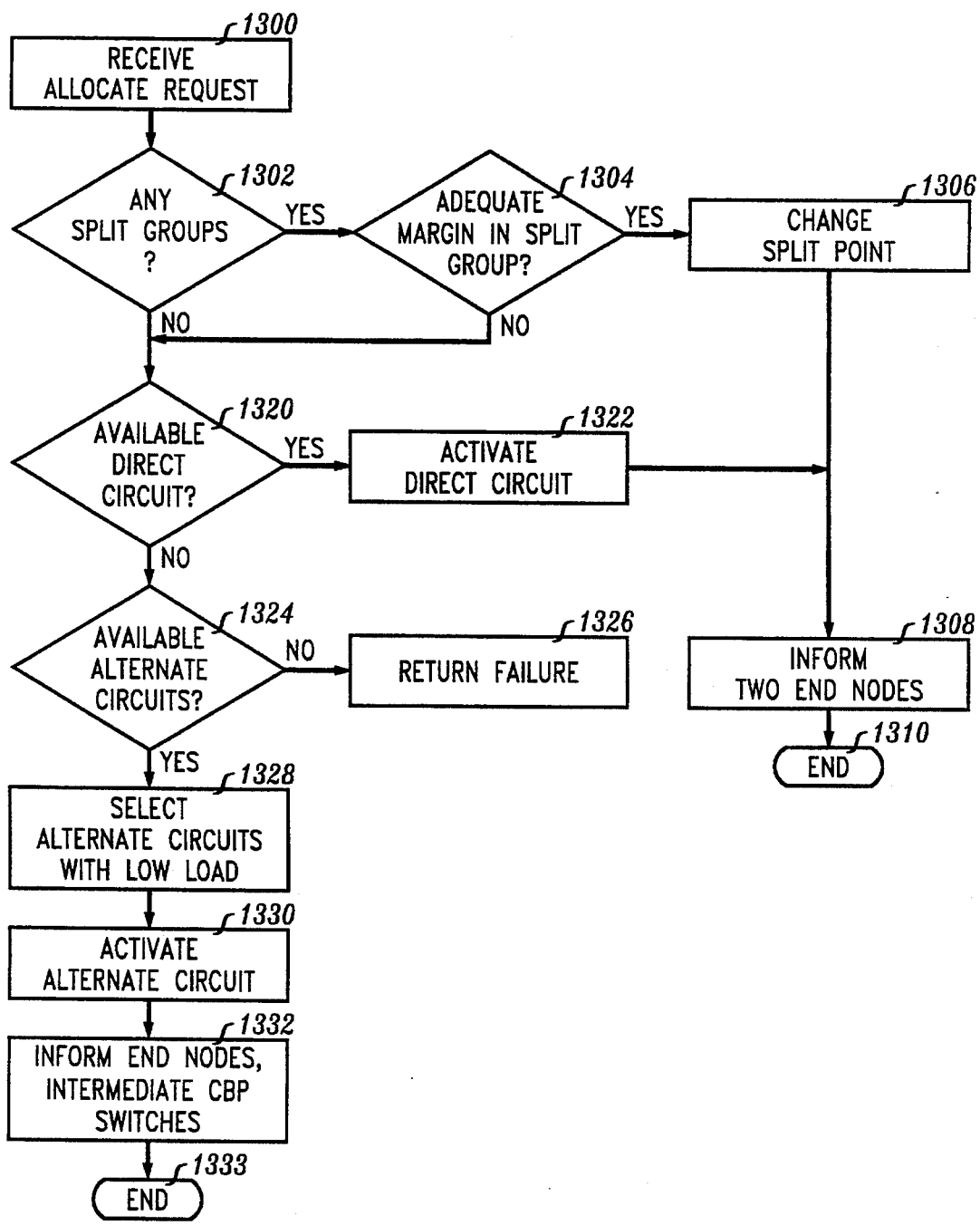

FIG. 16 describes the process of activating a virtual CBR circuit. Many more virtual CBR circuits are provisioned (i.e., stored in memories of the network) than can be active at any one time. Basically, virtual CBR circuits are provisioned to handle the peak traffic between any pair of nodes (in this case switching modules). Virtual CBR circuits are considered activated when they are available for carrying traffic. The process of activation is designed to ensure that the physical ATM circuits carrying the virtual CBR circuits are not overloaded and that no defective physical ATM circuits are used to carry traffic. In case of a failure, for example, all virtual CBR circuits that use the failed facility must be deactivated.

In this specific embodiment, the process of activating virtual CBR circuits is analogous to the process of seizing individual trunks in accordance with the teachings of the real time routing arrangement as described in G. R. Ash et at.: U.S. Pat. No. 5,101,451, by routing additional traffic over less heavily loaded transmission facilities, in this case, SONET/ATM facilities. One special characteristic of the arrangement described herein which is not analogous to a situation encountered in routing traffic over individual trunks is the use of split groups, illustrated in FIG. 5, i.e., active virtual CBR circuits a portion of whose channels are used for outgoing traffic in one direction and another portion of whose channels are used for outgoing traffic in the other direction. Such split groups are especially efficient for use in carrying traffic between two nodes for which the level of traffic is relatively low. Another difference is that more links may be required for alternate routed traffic so that the load of several links may have to be considered in selecting an alternate route PVC for activation.

An administrative module receives an allocate request from a switching module processor 511 (action block 1300). The administrative module first determines (test 1302) if there any virtual CBR circuits carrying split traffic (i.e., outgoing from the two end nodes). If so, the administrative module determines how many circuits are currently busy in each direction and checks if there is adequate margin in the split group to allow for an additional few channels to be allocated in the direction associated with the allocate request. The channels of split groups are arranged so that the first n channels are hunted in one direction and the remainder in the other direction and that the hunt for a channel is performed in such a way as to keep the middle channels available whenever possible. If middle channels are available and if the number of these available channels is sufficiently large to allow for a movement of the division point (positive result of test 1304) then the split point is moved (block 1306) and the two end nodes are so informed (action block 1308). The requesting node is informed of a success in response to the allocate request and when the requesting SMP retries test 1202 and 1208, one of these will now pass. In this embodiment split groups are checked first; simulation studies may show that the alternative of checking for available additional PVCs first, is more optimum.

If no split groups are available (negative result of test 1302) or if there is inadequate margin in the split group(s) (negative result of test 1304) then test 1320 determines if there is an available idle provisioned direct virtual CBR circuit. If so, it is necessary to check whether activation of an additional CBR PVC will cause congestion on any link carrying that PVC. If such congestion is found, that idle provisioned direct virtual CBR circuit is rejected and not activated, and test 1324 is tried; if no congestion is caused, that circuit is activated (action block 1322) and the two end nodes of that circuit are informed of this activation (action block 1308). Otherwise, test 1324 is used to determine if there are any alternate available virtual CBR circuits. In making the choice among available alternate CBR circuits, the principles of real time network routing are used by preferably selecting available alternate virtual CBR circuits that use relatively lightly or less heavily loaded ATM facilities. In making the determination of which facilities are less heavily loaded, since two link circuits are preferred over 3-link circuits, the loading of the potential 2-link circuits can be ascertained by requesting the administrative module connected to the CBP that is connected to the destination switching module to report on the loading of its ATM circuits. Since each activation of a virtual CBR circuit represents a larger utilization of resources (48 channels versus 1 channel) than is the case for the selection of a single trunk for real time network routing, a loading threshold limit beyond which virtual CBR circuits should not be activated should be applied for any facility that is used by a candidate CBR PVC. The limit is also affected by the amount of VBR traffic supported by the ATM facilities. Clearly, this limit is a parameter which should be under control of the network administrators, which may be different for different ATM facilities, and which should be adjusted as field experience is obtained.

Note that in the preferred embodiment, all provisioned PVCs have a predetermined path traversing two end nodes and a variable number of intermediate nodes. Alternatively, partly provisioned "PVCs" could be provided having a variable path selected at activate time.

If no available alternate CBR virtual circuits are available for assignment, then the allocate system returns a failure indication to the requesting SMP (action block 1326). If an available alternate circuit has been chosen (action block 1328) (the available circuit is selected among alternate circuits with relatively low load) then the alternate circuit is activated (action block 1330) and the end node and intermediate CBP switches are notified of the activation of the CBR virtual circuit.

The active CBR PVC consolidation process will now be discussed. In the course of normal toll call activity, it usually happens that different composite cells between two end nodes are not completely filled. Furthermore, it is a frequent occurrence that the total number of DS0s in two or more active composite cells is less than or equal to the total number of DS0s supported by one composite cell (48/46). In that case it is desirable to consolidate the PVCs carrying these cells to form one more fully utilized cell that carries the DS0s. The PVC for composite cells which no longer have active DS0s can then be made inactive, thus freeing bandwidth on one or more ATM facilities. That freed bandwidth can then be used for composite cells between other sources and destinations. Thus, more efficient utilization of the network is achieved. The consolidation process is described in FIG. 17.

In the discussion that follows the composite cells being consolidated will be discussed as being between SMs, and the processing of consolidation is performed by the SMPs of the two SMs. Alternatively, and especially for the architecture wherein several SMs are connected to an ATMU, since the processing of the composite cells is performed by the ATMUs, it is also possible that if the ATMUs were arranged as part of the CBP, then the AM would control the consolidation of composite cells instead of the SMP. However, the processing would be the same in either case, only the identity of the processor would be different.

To perform consolidation, the switching module processors continually check active composite cells for a partial fill condition which is defined to be two composite cells to the same destination such that the total number of active DS0s within both cells is less than the total number of DS0 in one composite cell (i.e., 48/46). The amount by which the sum of the active channels in the two cells is less than 48/46 is a parameter which should be set as a result of simulation and experience. If the parameter is too low, say zero, thrashing may occur; if it is too high, say 10, inefficient use of facilities will occur. For this discussion a cell and its corresponding PVC are used more or less interchangeably. Each active cell is under the control of one connected end node, the end node that originates outgoing traffic, or, in the case of split traffic cells, a node selected arbitrarily. When the controlling SMP (i.e., the SMP of the controlling node) determines that a partial fill condition exists, it communicates a request to the destination node (typically another switching module) to consolidate the two composite cells. The request contains:

The identity of the two composite cells (e.g., via the Virtual Circuit Identifier). One cell is the consolidated cell, and one cell is the cell to be eliminated (since it will carry no DS0s following consolidation.)

A list of DS0 cell re-ordering from the cell to be eliminated to the consolidated cell.

In this embodiment, DS0s of the consolidated composite cell remain in the same cell locations, and DS0s from the eliminated cell are moved to idle positions in the consolidated cell.

The other node responds with an acknowledgement to consolidate. During the consolidation period, new calls that require transport between these two nodes (typically switching modules) will only use DS0s from the consolidated cell that are not to be filled from the cell to be eliminated. It is possible that calls could arrive and therefore trigger the activation of a PVC for one composite cell while another PVC is being eliminated. This unlikely occurrence is in accordance with the invention since eventually excessive PVCs are eliminated.

In order to consolidate, newly arriving DS0 signals for the cell to be eliminated are sent into both the consolidated cell and the cell to be eliminated. Within the ATMU, the space switch transfers a DS0 on an NCT link from the SM to two different CWB locations.

The SMP commands the ATMU CC to perform this function. After performing this action, the SMP sends a message to the other node indicating that the aforementioned copy action has transpired. The other node must send a similar message to the original node. Upon reception of this message, the SMP commands the ATMU CC to deactivate the PVC of the eliminated cell. The ATMU CC causes the space switch to read DS0s from the CWB locations associated with the consolidated cell's new DS0s from the eliminated cell. The ATMU CC then removes this cell from the CLP's active composite cell list. The eliminated composite cells are longer sent or processed into DS0s on the NCT links. Since the DS0s are switched via the space switch to the NCT links, there is no change of time slots on the NCT links to the SM TSI. The other end then also deactivates the PVC of the eliminated cell.

A problem arises if a channel from one cell is transferred into the same channel in another cell; during the period of transition, this cell would be written into the same channel position of two buffer locations. This problem can be overcome in one of three ways:

The speed of the CWB can be doubled to allow two writes to occur in one interval the consolidation can be arranged through software to avoid such a transition the transition can be made in two stages, first by freeing another channel of the transferred-to cell by copying a busy channel to the idle position and then releasing the previously busy channel, then by transferring the channel from the cell being released to the newly released channel of the target cell.

If two or more SMs are connected to one ATMU, either the SMP of one of the SMs controls the PVC being deactivated or, preferably, the AM of the connected CBP controls the PVC. In either case, only a single processor controls the consolidation process at the controlling node.

Figure 17:
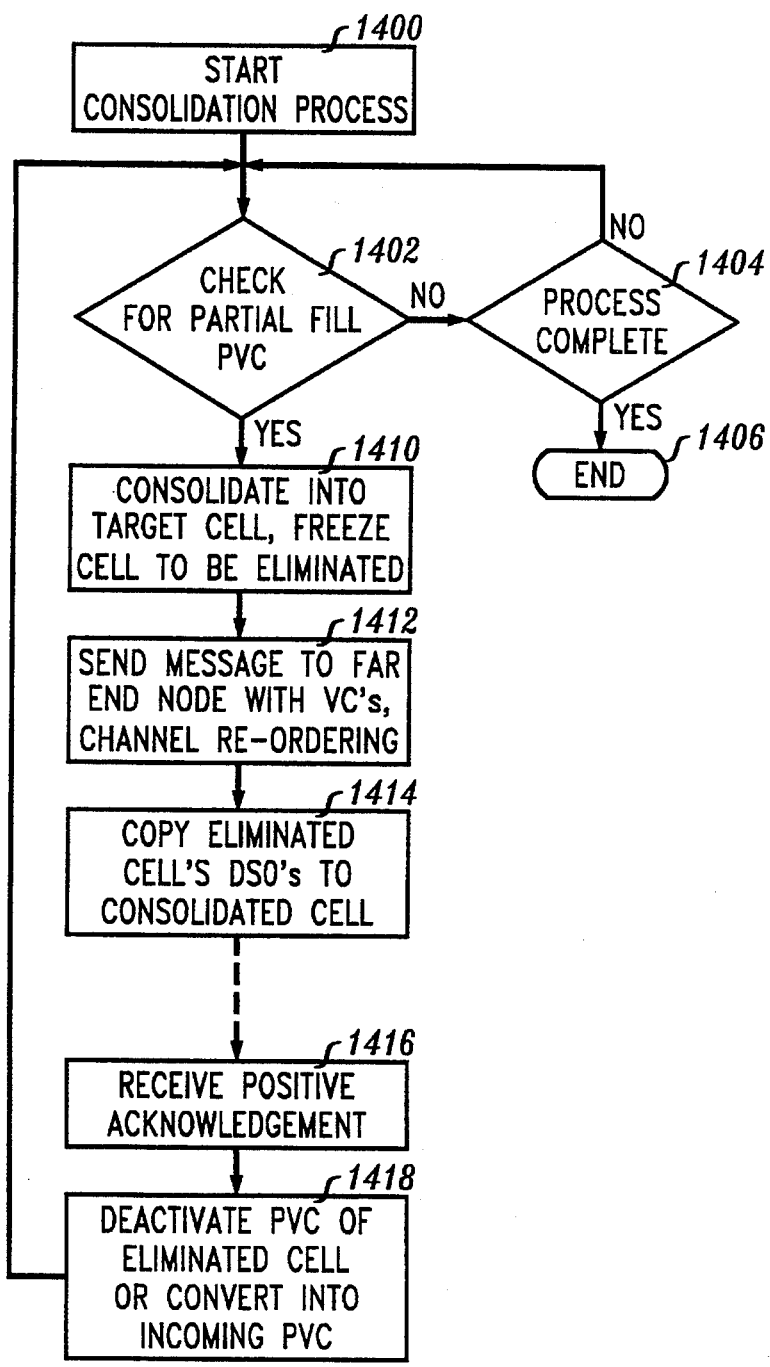

A flow chart for implementing the consolidation process is shown in FIG. 17. At some point, the consolidation process is started by the processor which controls allocation of permanent virtual circuits (action block 1400). A test is made to determine the existence of partial fill permanent virtual circuits (test 1402). This test is performed by checking to see if there are PVCs with a common source and destination node which in combination carry less traffic than can be carried by one PVC. Since there is normally an order to the search for PVCs to a particular destination, the partial fill PVCs are most likely to be found at the end of such a list. As each pair is checked if the partial fill condition does not exist (negative result of test 1402), a check is made to see if the process is complete (test 1404) and if so, this is the end of the consolidation process at this time (end block 1406). If not, another pair of PVCs is checked for the partial fill condition. (In general, it is expected that no more than one PVC would carry bi-directional traffic. A bi-directional PVC can be eliminated in two steps by first eliminating the outgoing channels from one direction and after these channels have been eliminated in the process described hereinafter, converting that the cell to be eliminated not to a cell of an inactive PVC but to a cell of a uni-directional PVC now fully controlled by the other end node.)

If a pair of partial fill PVCs are found (positive result of test 1402), and it is found that the total traffic carried over the route served by these PVCs can be adequately served by one less PVC (to eliminate excessive shuttling of PVC activation-consolidation), then the controlling node (carrying outgoing traffic for that PVC) consolidates channels from a cell to be eliminated into the target cell (action block 1410). A message is then sent to the far end node (the node with incoming traffic for that PVC) informing that node of the new channels to be occupied by the channels from the PVC which is to be deactivated (or, in the case of a two-way traffic PVC, to be converted into a one-way traffic PVC). The outgoing node also arranges to have traffic from the channels of the cell to be eliminated transmitted to both the cell of the PVC to be eliminated and the consolidated target cell (action block 1414). The outgoing side node then waits to receive a positive acknowledgment message from the incoming traffic node (action 1416). In response to that message, the PVC corresponding to the eliminated cells is deactivated (action block 1418) (or, in the case of a two-way PVC, that PVC is then converted into an incoming traffic only PVC). Following execution of block 1418, other PVCs are checked for the partial fill condition (test 1402).

DETAILED DESCRIPTION

1. Overview of ATM Unit (ATMU) Functions

FIG. 7 is a block diagram of a specific embodiment of the invention based upon the 5ESS switch architecture. The Asynchronous Transfer Mode Interface Unit (ATMU) provides the interface between a switching module and the common broadband platform (CBP). The CBP acts as a combination communication module for interconnecting connected switching modules and as an ATM crossconnect for connection via ATM links to other CBPs. The 5ESS Switch Module normal format for voice and data transport is a single byte time slot. The CBP format is a 53 byte cell containing 48 bytes for voice and data transport and 5 bytes for overhead. The ATMU provides the conversion between the single byte time slots and the 53 byte ATM cells. It also provides arrangements for transmitting the multiple time slots required, for example, for a 384 kilobit/second channel, into different bytes of a single ATM cell. The 5ESS Switch Module interfaces to the ATMU over Network Control and Timing (link type 2) (NCT) links and the ATMU interfaces to the CBP over Synchronous Digital Hierarchy (SDH) or its U.S. version, Synchronous Optical Network (SONET), links. The SDH or SONET links transport ATM cells. By providing voice and data switching the CBP eliminates the need for the time multiplexer switch used in the communications module of a prior art 5ESS system. In this preferred embodiment, the switch module (SM) is larger than that described in the *AT&T Technical Journal* reference to take advantage of the higher speed circuitry available today. The dimensions of the SM are discussed below, as appropriate. While in this embodiment the CBP interfaces via the ATMU with switching modules of one switching system, it can equally readily interface with one or more stand-alone switching systems.

The CBP also provides SM message routing to both the Administration Module (AM) (of the 5ESS switch), and to other SMs, thus eliminating the need for intra-switch message router. The ATMU converts the SM messages from Message Handlers and/or PSU of the 5ESS Switch Module to a format suitable for routing across the CBP. A standard ATM Adaptation Layer is used for this purpose. The ATMU also provides transport for the CBP Processor Intervention (CPI) function that can be used to force a restart of an SM if a situation arises that requires a reset.

Signaling System 7 (SS7) messages are handled by virtual circuits of the toll network, thus providing switch to switch messaging without the need for an intervening STP for routing messages. (An STP, at least initially, is still desirable for use in accessing data bases, by providing data base access to the signal transmission network 10.) The ATMU implements this function by assembling packets into ATM cells, associating a virtual path with each switch SS7 Point Code and then transferring the cells to the toll ATM network over the designated virtual path.

The preferred embodiment described herein takes the view that the ATMU is closely associated with the SM, since that appears to be the most useful from the toll network point of view. An alternative wherein the ATMU is closely associated with the CBP is also possible. If the ATMU is closely associated with the CBP, then the ATMU receives its control from the Common Broadband Platform's controller and the AM. In the event that the ATMU is closely associated with the CBP, control signals are sent via CBR or VBR PVCs from the AM to the ATMU central controller (ATMU CC).

As shown in FIG. 7, the CBP is under maintenance control and circuit control of the AM. The AM acts as the ultimate maintenance master for the Frame Controller of the CBP, i.e., the CBP. In this embodiment, the CBP serves only as an ATM crossconnect, and provides no processing for either video broadcast, frame relay, or Switched Megabit Data Switch (SMDS). Alternatively, the ATM crossconnect can be directly controlled to accept ATM inputs and to switch such inputs to a desired destination. This arrangement is useful, for example, for switching such broadband signals as high definition TV (HDTV) signals, which have a bandwidth that makes direct connection to the CBP more economical. The AM or another special processor can be used for controlling the establishment of ATM paths for these services.

The assumption is made herein that computers or other terminals that send or receive data have reserved adequate bandwidth for sending and receiving such data before making a request for a connection through a CBP.

2. Composite Cell Types

A composite cell of 48 bytes is used to carry a PCM data sample from 48 different calls, (if the service is a 64 kilobit/second voice). The cells for each bundle of calls are sent every 125 μs to transport 48 DS0 channels, each DS0 channel for transmitting 8 bit PCM samples or data 8000 times per second.

Alternatively, 46 DS0 channels are carried and a two byte index is used to identify which group of 46 DS0 channels on a given virtual circuit group is carried in a particular cell. In this alternative, a plurality of ATM cells for one virtual circuit group is transmitted every 125 μs, but cells with a particular index are sent only once every 125 μs. The alternative serves to decrease the number of virtual paths a network must support, and saves memory in the ATMU and CBP, since the same memory entry can be used for switching all CBR PVCs that connect a given source to a given destination over a given set of links.

3. Architecture Overview

This section discusses the high level design of the Asynchronous Transfer Mode Unit (ATMU) that is used to perform the following two general functions:

Conversion of DS0 Transport to ATM Composite Cells

Conversion of Variable Length Messages to ATM Cells 3.1 Overview Of DS0 To Composite Cell Conversion This overview focuses on DS0 flow from the 5ESS switch to the ATM network (CBR traffic).

3.1.1 Space Switch

A block diagram of the ATMU is shown in FIG. 8. Network Control and Timing (NCT) links from the SM Time Slot Interchange TSI 517 are shown terminated on a space switch within the ATMU. The purpose of the space switch is to fan out the NCT links to 48 (or 46) internal links, depending on which byte within a composite cell is used for a given call. These links terminate on an array of cell memory devices, called the Cell Wide Buffer (CWB) in FIG. 8, that store the 48/46 DS0 PCM samples of a composite cell. Thus, the space switch serves to route time slots (DS0s) to the correct composite byte location on the input of the CWB.

3.1.2 Cell Wide Buffer

The function of the Cell Wide Buffer (CWB) is to assemble the bytes of the virtual path cells in a format which allows them to be simultaneously read out in a single memory read cycle. The CWB is a buffer whose width is the size of one ATM cell (not counting header bytes). The width is 48/46 bytes, and the depth equals the number of unique active virtual paths that needs to exist at a given moment. (For the 46 byte composite cell, each active instance of a cell having a particular index and virtual path is considered a unique active virtual path.) As shown in FIG. 8 each of the PCM byte positions in the cell is written into separate memories each of which has independent write control circuitry. Each memory address in these memories corresponds to a specific virtual path. (In the case of 46 byte implementation, contiguous memory locations are used for the multiple ATM cells in the virtual path). Each of these byte memories has a control memory that maps individual 48/46 link time slots (only the PCM part) to one virtual path byte location in the CWB. Since the control memory for each byte memory is independent, each active time slot on the 48/46 links is able to go to any virtual path memory location in the buffer. Thus, bytes on the 48/46 links that appear at the same time at the input to the CWB can be stored in different virtual path memory locations in their respective buffer memories and thus assembled into different virtual path cells in the CWB. The control memory is able to block a write to the byte buffer memory if a particular DS0 on an NCT link is not active i.e., not presently in use for a any call.

3.1.3 Cell List Processor

During every 125 μs interval all active DS0s are written into the assigned byte locations of their selected virtual path cell. Composite cells are read from the cell wide buffer every 125 μs under control of the Cell List Processor (CLP) 630, shown in FIG. 8. The CLP has a list of active composite cells that are stored in a linked list. The linked list stores the ATM virtual path address header bits, and the CWB address that holds the virtual path's composite cell. The CLP list only stores the virtual paths for which active DS0s exist. The CLP traverses the list once every 125 μs, thereby causing each composite cell to be transmitted. After the CBR cells are transmitted, the CLP reads VBR cells (if any are queued) from the Message Layer Device (MLD) 670 to use up spare time in the 125 μs interval, as illustrated in FIG. 3.

3.1.4 Conversion to Synchronous Time Multiplex (STM)

Since the cell wide buffer is the width (data part) of an ATM cell, an entire ATM cell can be read from the cell wide buffer in one access. Parallel to serial conversion is implemented by means of parallel-in serial-out shift registers 651, ..., 652 which are selected by means of the Shift Register (SR) Selector 653, ..., 654 under control of the CLP 630. The read data along with ATM header data from the CLP is loaded into a shift register that connects to a SONET facility interface 661, ..., 662. In the case of a 46 byte cell, the two byte index is also provided by the CLP 630. The SONET facility interface connects directly to the CBP.

3.1.5 Miscellaneous

Other areas addressed in this specification are bi-directional voice and data transport, functions such as path test and monitoring, ATM congestion tests for determining if a given provisioned path can accept the activation of a new composite cell load, as well as control and fault tolerancy. These are discussed in detail in Section 4.

3.2 ATMU Control

The control of the ATMU is provided by the ATMU central controller (ATMU CC) 600. Control messages are received in the ATMU CC from dedicated time slots intercepted in the space switch and transmitted to the ATMU CC over a dedicated control bus (not shown). The control messages are transmitted from a switching module processor (SMP) 511 of the 5ESS switch module (SM) 510 via a Message Handler 513 in the SM. The control signals from the ATMU CC are distributed in the ATMU over a group of control buses. The Space Switch 610 is provided with path set up and messaging control memory information, active link selection and active side selection. Link selection is used to determine which NCT links from the SM are active. Alternatively, the E-bits, discussed hereinafter, can be used to identify the active links since E-bits are only active for active paths. Link selection is used to determine which NCT links from the SM are active. The links can be either active or standby. The side selection determines which side of the ATMU is active or standby. The Cell Wide Buffer is provided with the mapping of the time slots to virtual paths and allocation of byte positions within the ATM cell. The Cell List Processor is provided with active virtual path information and provides the Shift Register Selector 653, ..., 654 with shift register address information. In this ATMU design, the ATMU can support more than one SONET facility, and so each ATM cell can go to one of the possible 8 Shift Registers. The CLP is provided with the identity of the proper shift register for each virtual path. The Inter-Working Units (IWU) 1020, 1022, ..., 1024 (FIG. 12) of the MLD are provided with the provisioned virtual path destination addresses also. The ATMU CC provides the maintenance control of the ATMU. Maintenance messages for the ATMU CC itself such as initialization of the ATMU CC are received over the dedicated control bus before entering the space switch.

The ATMU is controlled by the SM in the preferred embodiment. Alternatively, the ATMU can be controlled by the CBP. In that case the ATMU Controller receives control from the Common Broadband Platform's Controller. The ATMU provides SM to SM, and SM to AM message based communication services for the 5ESS switch via interprocessor packets.

3.3 Message Interworking

The ATMU provides the following message based communication services for the 5ESS switch:

SM to SM, and SM to AM via interprocessor packets
SS7 Message Transfer Part (MTP) packet transport Both of these functions are handled in a similar manner. In FIG. 8, the Message Layer Device (MLD) receives messages from the SM via the space switch. Variable length 5ESS switch and SS7 messages are carried in time slot channels that originate from protocol handlers (PH) in the Packet Switching Unit (PSU) or from the SM Message Handler. The MLD contains three types of Inter-Working Units (IWU), the 5ESS switch messaging IWU, the SS7 IWU whose function is to reconstitute messages from the SMP, and the inter-PSU IWU for handling user to user data messages. The function of these units is to:

Accept messages carried from the space switch
Associate a virtual path that connects to the destination identified in the message's header
Perform ATM segmentation and reassembly
Shift data, when instructed by the CLP.

The handling of SS7 is slightly different than 5ESS switch interprocessor messages. For 5ESS switch interprocessor messages, the frame is relayed in a virtual path to the destination AM or SM. The messages are processed to read the destination address. The destination address determines which Virtual Circuit the ATMU uses for segmentation to cells.

In the SS7 message case, the signaling data link is terminated in the SS7 IWU, and the MTP message is relayed on a virtual path to the destination toll office. The handling of cell based messages coming from the ATM network and general control and fault tolerancy are discussed in detail in Section 4.

For inter-PSU messages, the messages are processed to read the destination PSU address; this destination address determines which virtual circuit the ATMU uses for segmentation into cells.

3.4 SM/ATMU Remoting via SDH/SONET

In this embodiment, the CBP and ATMU are connected via intra-office SDH/SONET (Synchronous Digital Hierarchy/Synchronous Optical NETwork)

facilities that carry ATM. The SM with ATMU is not a Network Element as viewed by the SDH or SONET network, and does not terminate the digital communications channel (DCC) section overhead. However, the intra-office facility is optical, so that an SM with ATMU can be remoted from the CBP. If the SM with ATMU connects directly to the CBP, then only fibers (and, where appropriate, repeaters) are needed for such remoting.

In the event that an SM with ATMU is remoted via the general SDH/SONET network, then SDH/SONET multiplexors or crossconnects that support Synchronous Time Multiplex-1 (STM-1) and multiplexed STM-1 are used in order to properly terminate section DCC at the SM end. In this general case the SONET/SDH facility at the SM end must be terminated by a SONET/SDH multiplexor in order to provide an intra-office SONET/SDH facility directly to the ATMU. This will make it unnecessary to develop separate SDH/SONET DCC Operations Administration Maintenance (OAM) functions in the SM and avoid the possible confusion of having both the CBR and the SM performing SONET/SDH OAM processing in the same office.

The above discussion applies only to the SM to CBP links (assuming that the ATMU is pan of an SM). The CBP terminates section DCC for interoffice trunks, and is viewed by the SDH/SONET network as a general Network Element. Thus, due to the capabilities of the CBP, the 5ESS switch (i.e., an AM, a group of SMs, their associated ATMUs, and a CBP) is an SDH/SONET Network Element even though the SM by itself is not.

Alternatively, it is possible to associate a group of ATMUs directly with a CBP instead of directly with the SMs. In this case, the NCT links connecting the SMs with ATMUs are longer as in the well-known case of optically remoted SMs for the 5ESS switch. In that case, a SONET facility can be used to convey the ATM signals to the CBP in essentially the same way as distant ATM signals are conveyed thereto, or if the CBP can be so arranged, the ATM signals can be directly transmitted from the ATMU to the CBP.

3.5 ATMU General Functions

This section summarizes the functional relationship of the ATMU to the CBP and SM. The ATMU is treated by the connected SM(s) as an intelligent peripheral unit that receives control messages from the SMP(s) in the same way that other intelligent units do. The purpose of the ATMU is to provide:

1. SM time slot to ATM composite cell conversion assuming fixed, provisioned virtual paths. Up to about 10,000 time slots (20 NCT links) are supported using present technology. (An NCT link transmits 512 multiplexed DS0 bit streams, and uses optic fiber transmission.) The ATMU can route any incoming time slot to any byte position of any connected active CBR virtual path. The active CBR virtual paths are a proper subset of a large number of pre-provisioned virtual paths, most of which are not active at any one time.
2. Inter-SM and SM to AM and/or SS7 variable length message to ATM cell virtual path conversion, using fixed provisioned VBR paths. Because of the high priority of SS7 messages, it is desirable to pre-allocate VBR bandwidth for the SS7 signal paths. The ATMU transports inter-SM Link Access Procedures (type) B (LAPB) frames without any termination of LAPB protocol. In the case of SS7, the ATMU terminates the SS7 Level 2 (HDLC Part), and transports MTP/SCCP (Message Transfer Part/Signaling Control and Connection Part) messages. The MTP protocol is not terminated at the ATMU.
3. An SDH/SONET facility access to the CBP is provided for the virtual path cells. The rates are STS-3 (Synchronous Time Signal) to STS-12 and STM-1 to STM-4 for SONET and SDH respectively, and a sufficient number of these facilities is provided to meet outgoing composite cell needs for an SM supporting up to 10,000 trunks. For more or fewer trunks, more or fewer facilities can be equipped.
4. Handling of NCT A-G bits (bits that are sent with each PCM sample from the SM to the CBP) that is as transparent as possible to the SM, including E bit (supervision of a time slot) functions. Time slot parity on the NCT is also terminated/generated.
5. Support Central Processor Intervention (CPI) This is a function that sends special bits on the NCT link that will reset the SM's processor, in case that processor loses sanity.
6. Support inputs from a plurality of SMs.
7. Support inter-PSU user to user message traffic.

4. ATMU Components

This section discusses the design of the individual blocks of the ATMU and the duplication plan to achieve high reliability:

Space switch 610
Cell Wide Buffer 620
Cell List Processor 630
SS7 message Inter-Working Unit 1022
Inter-SM/AM message Inter-Working Unit 1020
ATMU Central Controller (ATMU CC) 600

The first three blocks of the ATMU listed involve DS0 to composite cell conversion. The next two blocks involve variable length message to ATM cell conversion. For purpose of architectural discussions, the SS7 and intra-switch IWU are considered to be part of the Message Layer Device.

Discussed after the ATMU CC section are alternatives for implementing the CBR Processor Intervention capability of the ATMU (with CM-ATM).

4.1 Space Switch 4.1.1 Functions

The space switch interconnects NCT link DS0s from the SM Module Controller Time Slot Interchange (MCTSI) with NCT bus DS0s to the Cell Wide Buffer (CWB) and the ATM Message Layer Device (MLD). The number of NCT buses to the CWB depends which composite cell is used, either 46 or 48 depending on whether an ATM CBR cell conveys 46 or 48 DS0 signals. There also is one NCT bus to the MLD. By convention, NCT buses on the "SM MCTSI side" are called links, buses on the "CWB side" are called NCT buses. Anywhere from 2 to 20 NCT links (i.e., up to 10,000 trunks) (or more in a next generation SM) can be supported by the space switch. The internal design of the space switch is shown in FIG. 9. The fabric is the core of the design, and consists of multiplexors that accept up to 20 NCT links. These multiplexors have a control memory that selects one of the up to 20 NCT links for each of the 512 locations on the NCT link. The selected NCT link's time slot is then the output of the multiplexor for the given time slot period. The number of multiplexors is equal the number of bytes in the composite cell (i.e., 46 or 48 multiplexors) plus one more multiplexor to create the NCT bus to the MLD. Thus there are a total of either 47 or 49 multiplexors depending on the composite cell chosen for the overall system. In this manner, any of the 512 time slots on any of the NCT links can be connected to any of the byte locations in the cell wide buffer or the MLD.

The NCT links from the MCTSI terminate on the NCT Link Interfaces (NLI). The NLIs present a synchronized set of backplane buses to the space switch multiplexors so that all multiplexors are switched synchronously. The multiplexors then present a set of synchronized buses to the CWB and the WILD.

In the reverse direction (i.e., from CWB towards SM MCTSI) the space switch operates in exactly the same manner. Bytes from the CWB terminate at fabric multiplexors driven by control memories. The output of these multiplexors connect to NLIs that then cross couple to SM MCTSI hardware.

4.1.2 Fault Tolerancy

The core fabric of the space switch interfaces to the NCT links via the NLI cards. The NCT links are duplex, meaning they originate from each side of the SM MCTSI. In order to cross couple to the SM MCTSI, the NLIs themselves are duplicated. The NLIs are part of the core fabric failure group, so that each side of a NLI connects with one multiplexor fabric side. The NLIs are coupled to both sides of the SM's TSI, but attach to only one side of the space fabric. Thus, either space fabric side can reach either SM TSI side. The multiplexor fabric cards connect directly to the CWBs. The NLI, multiplexor fabric, and CWB are all in the same failure side. As discussed below, the Cell List Processor is also in this same failure group. From a system perspective, the cross coupled NCT links terminate two common sides of the ATMU, each of which has a space switch plus associated hardware to form the ATM cells.

The NCT buses are coupled via the space switch to the MLD. The MLD is cross coupled with the space switch, and is in its own failure group.

The space switch (with NLI) uses the following error detection methods:
  Parity on NCT time slots
  Parity on control memories
  Parity on control buses from the ATMU CC
  Loss of clock and synchronization
Errors from these detectors are send to the ATMU CC, which then executes fault management procedures.

4.1.3 Space Switch Control

The control memories in the multiplexors, as well as other control registers used to select active NCT links and ATMU sides, are all under control of the ATMU Central Controller. The space switch hardware has no firmware or software; all control is provided via buses from the ATMU CC.

There are two operational uses of the space switch, both of which require space switch memories to be written by the ATMU CC, namely call circuit switching and provisioning of message DS0s from message sources in the SM to the MLD. For call circuit switching, when a call is set up, signals for one DS0 must be connected to a cell wide buffer virtual path byte location. The SMP (in conjunction with the AM) determines the virtual path byte location to use for each DS0 signal. The SMP causes each DS0 signal to be placed into an NCT link time slot using an MCTSI TSI slice, and then orders the ATMU CC to write the appropriate multiplexor memory to route that DS0 signal to the correct CWB byte location. Cell wide buffer hardware then moves the DS0 signal to the correct virtual path cell in the memory.

The SMP provisions DS0 channels to carry messages from the Message Handler or PSU, through an MCTSI slice to the space switch. The SMP then orders the ATMU CC to write an appropriate multiplexor location that routes the DS0 channel(s) to the MLD.

In the above scenarios, the duplicated space switches are written with identical information.

4.2 Cell Wide Buffer (620) (FIG. 10)

4.2.1 Functions 4.2.1.1 General

One of the two output destinations of the space switch is the CWB 620 (FIG. 10). The width of the CWB is determined by the type of composite cell chosen (i.e. either 46 or 48 bytes wide). Each byte location in the CWB has a control memory called a Time Slot Assign (TSA) that loads the virtual path byte for each NCT time slot received (FIG. 10). The TSA can also be programmed to not accept a given time slot on the NCT bus. Thus, each cell wide buffer location can, on a per NCT slot basis, independently load a different (or identically same) virtual path composite cell. (The serial NCT link signals shown in FIG. 10 are converted into bytes prior to being stored in buffer 801).

The unloading of the CWB towards the CBP is under control of the Cell List Processor (CLP) 630. The CLP makes requests synchronously to the CWB by sending an address and a read request. An entire 48/46 byte cell is read at once in one memory access into a shift register. At the same time, the CLP loads the cell header into the shift register. The shift register is shifted out to an SDH/SONET facility Line Processing Unit (LPU) 661, ..., 662. CLP read operations of the shift registers are interlaced with the TSA controlled writes from the NCT links.

In the reverse direction (from CBP to SM MCTSI) the cell header is unloaded from the shift register into the CLP. The CLP uses the header to determine the CWB location for the call. Then, the CWB is loaded from the shift register into the buffer. Finally,-the TSA control memories in the buffer read the bytes onto the NCT buses at the correct time.

The depth of the CWB until now has been discussed as being equal to the total number of (active) virtual paths so that one DS0 per virtual path (in each direction can be stored). However, the buffer must be two or three times as deep (depending on direction) due to the following reasons:
  The fundamental nature of ATM is that jitter of cells can occur due to random internal queuing within the CBP.
  CWB loading and unloading from the shift registers must be synchronized with CLP reads and writes to/from the shift registers to avoid cells being sent that have DS0s from different NCT 125 $\mu$s frames. Such frame misalignment could disrupt the continuity of N*DS0 services being transported by the composite cell.

To solve this problem, in the direction from the SM MCTSI towards the CBP, the CWB is double deep (two partitions). This means that the space switch loads one half of the CWB, while the CLP reads from the other half. After one partition is written the CLP and space switch access the other partition. Each half (partition) is identical in composition (i.e., has the identical number of virtual circuit composite cells supported). In the direction from the CBP towards the SM TSI, the CWB is of triple depth (three partitions) in order to allow 125 μs of "build-out". Build out is used to keep the CWB from "under-running", and amounts to 125 μs of fixed delay. Under-run occurs if cell jitter occurs to the extent that no new DS0 exists in the CWB when the NCT bus time slot must read that location. Thus, two of the "partitions" of the CWB provide the buffering to account for the jitter, and the third partition accounts for the time to read the DS0s from the CWB without interference from cell writes due to incoming cells. The control memories in the TSA of the CWB automatically cycle through the CWB buffer partitions. The CLP determines into which partition an incoming cell from the CBP a cell should be written. The partition varies from virtual circuit to virtual circuit due to the fact that jitter can cause (e.g.) zero, one or two cells to arrive in a given 125 μs interval. If cells are lost, then the triple buffer CWB can wrap around (in effect an underrun). This is detected if the space switch and CLP ever access the same partition, and causes the CLP to read from the partition that is furthest in time from the current build-out partition.

4.2.1.2 DS0 Path Monitoring/Test

Monitoring circuitry is provided to determine that composite cells are being received by the ATMU every 125 μs on average. To achieve this, the CLP maintains a counter for each composite cell virtual path that is active. Every time a cell arrives, the counter is incremented. The counter increments on average every 125 μs. The counter may not increment exactly every 125 μs due to jitter of ATM cells resulting from random queuing in the CBP. This jitter is a fundamental aspect of CBPs. The CLP determines every 10 milliseconds (ms) whether the counter has incremented approximately 80 times. This will have a variation of plus or minus 3 due to near term jitter, and very low probability cell loss and insertion. If the counter is further from this value, the ATMU CC is notified which is able to read the counter to determine if virtual path loss has occurred. The counter is able to reach 8000 plus or minus 4. The counter is then checked after one second to determine if it has reached 8000 plus or minus 4. The 8000 count is used to determine if a high cell loss per second has occurred.

A direct test of circuit continuity is designed into the ATMU. ATMU CWB memory devices at the source (towards the ATM network) insert a code (possibly multi-byte) into a byte location of a cell. This occurs before a talk path is connected. At the destination end of the connection, the cell wide memory devices read the pattern and detect a match. This byte code can be changed as part of the test to cause bits in the DS0 to toggle. This toggling can then be recognized within the ATMU CWB and reported to the ATMU CC. The ATMU CC can then cause E bits on (path continuity bits that are internal to a 5ESS switch and not transmitted over inter-switch facilities) on the NCT link that carries the DS0 signal to toggle, as well as send messages to the SMP that indicated that continuity has been established. (E-bit use is described in E. H. Hafer et al.: U.S. Pat. No. 4,280,217.

4.2.2 Fault Tolerance

The CWB is in the same failure group as the space switch, as discussed above so that failures in the cell wide buffer result in a side switch of the CWB, space switch and CLP and the MLD. The LPUs are cross coupled to the facility shift registers (FSRs) and CWB. Thus, a CWB can receive cells from either of the duplicated LPUs. Which of the two LPUs is being used is under control of the ATMU CC.

The primary error detection method in the CWB is parity over:
  NCT buses from the space switch
  Virtual path byte memories
  TSA control memories
  Control buses from the ATMU CC 4.2.3 Control The CWB is controlled by the ATMU CC. There is no firmware or software in the CWB hardware.

From an operational point of view, the CWB is used to map a given composite cell byte location to a particular virtual path. The SMP routes a DS0 channel through the SM MCTSI, and then causes the ATMU CC to connect a DS0 through the space switch to a given byte location on the CWB. The control memory in the CWB for that byte is then written with an address associated with the virtual path. This occurs in TSA control memories for both directions. At this point in time, a connection exists from an SM MCTSI DS0 and a given composite byte (DS0) on a given virtual path.

All other functions are likewise under control of the ATMU CC, including error detection control associated with DS0 continuity test and monitoring, and LPU state control.

4.3 Cell List Processor (FIG. 11)

4.3.1 Functions 4.3.1.1 General

The CLP 630 (FIG. 11) is responsible for moving cells between the CWB 620 and the Facility Shift Registers (FSR) 651, ..., 652 (FIG. 8.) Towards the ATM network, the CLP has a linked list of records that store the CWB location for each active virtual path. Every 125 μs the CLP traverses this list and causes the CWB to load all active cell into the FSRs. In the other direction, the CLP has an address look-up function that is used to load the CWB with cells incoming from the FSR. As stated in the description of the CWB, the CLP keeps track of the CWB partition to be accessed for signal transmission in both directions.

The FSRs connect to the facility Line Processing Unit (LPU) (661, ..., 662) which is the actual hardware device (circuit card) that transforms bits for transmission to the physical media, and that performs facility related maintenance functions. Thus the LPU card supports optics, synchronization, and SDH/SONET overhead processing circuitry such as Byte Interleaved Parity, etc.

FIG. 11 shows the internal design of the CLP. The sequencer 920 reads service request bits from the FSR. The request bits can be inhibited if an FSR does not connect to an equipped or otherwise In-Service LPU. The sequencer responds to a service request bit for a given FSR by checking a list of active virtual paths that are provisioned to the facility associated with the FSR. The list, stored in the virtual path list memory 930, accessed by the sequencer, is started at the beginning of every 125 μs interval, and must be completed before the start of the next 125 μs. The last requirement is a reflection of the fact that the bandwidth offered to a facility should not be greater than the capacity of the facility for constant bit rate services such as voice. Each time a service request is made, the sequencer reads a virtual path cell entry from the list, loads the FSR with the header information that is stored in the list entry, and causes the CWB to load the 48/46 bytes into the FSR.

In the 46 byte composite cell case, the 2 byte index is considered to be part of the header and is loaded by the CLP with the regular (e.g., VBR) 5 byte header.

Active virtual paths are made inactive by removing entries from the list of active virtual paths associated with an FSR. The ATMU CC has a buffer 921 it shares with the sequencer that the sequencer uses to add and delete entries from active lists at idle times while cells are being transferred out of the FSRs.

The forgoing was described in a sequential manner. However, in reality, significant overlap of operations exist. For example, the checking of FSR request bits overlaps with the accessing of previously checked FSR requests, as well as with the sending of read orders to the CWB.

In the direction towards the SM (from the ATM network), cells are clocked into the FSRs from the LPUs, and request bits are set. The CLP services these bits by first mapping the virtual path address in the composite cell header to a CWB location. This function is accomplished by the ATM Address Mapper (AAM) 940 within the sequencer which translates the ATM header address to a physical address in the CWB memory devices. The AAM also uses the an index associated with the FSR so that the same ATM cell headers can be used on the different facilities, otherwise the headers would have to be different on all facilities. Then the sequencer loads the cell in the FSR into the CWB location. All FSRs are on a parallel bus to the CWB, so that only one can be loaded at a time into the CWB. In the preferred embodiment, the AAM is implemented using a Content Addressable Memory (CAM).

The design of the sequencer 920 is based on the use of high speed logic (programmable logic) that runs at over 100 MHz and scans shift registers request bits, operates the CAM, reads the linked list, gates data between the CWB and shift registers, and counts the cell arrivals. Examples of such logic are the PAL logic circuit family manufactured by AMD that uses parts such as the 22V10 device provided by many manufacturers. Another component is the PLC14 by Signetics. Other gate array technologies exist from Texas Instruments that can also run 100 MHz plus.

4.3.1.2 ATM Congestion Test Function

One function of the ATMU is to be able to determine whether or not a composite cell virtual path that is about to be placed into the active state will experience congestion, and thus prevent such congestion from occurring. Congestion is defined as occurring if the utilization of the path increases above some threshold along any segment.

Alternatively, when congestion occurs, cells are marked by one or more CBPs along the path. The marking concept uses congestion control bits in the ATM header to test the occupancy of links between the source and destination. When the occupancy is above a threshold, the CBP (and other intermediate CBP) will mark the cell. The ATMU must note this and report the event to the ATMU CC, which then reports the event to the SM. In order to provide a static indication, the cells should all arrive marked over a period of a predetermined number of cell arrivals. Upon reception of a cell from an FSR that has request bits set, the CLP will transfer the congestion control bits and the virtual path identifier to a memory that is accessible by the ATMU CC. The ATMU reads this memory and reports the result to the SMP. If congestion occurs, new CBR PVCs are not activated if they use the congested link, and PVC consolidation (FIG. 17) is accelerated.

A diagnostic to test this mark detection mechanism is as follows: The CLP is ordered by the ATMU CC to set the congestion bits on a link known not to be congested. Downstream CBPs will not affect already set bits, so the far end ATMU should detect the set bits. The ATMU CC then orders the bits to be cleared. The receiving ATMU should detect that the bits are cleared. Such a test can be used to verify the detection circuitry of the marked ATM cells, and the ability of the network to transport these bits after they are marked.

The exact use of the congestion bits has not been determined by the CCITT. In the arrangement described herein, these bits are used to verify bandwidth in a manner analogous to the frame marking algorithm used in Frame Relay. That algorithm drops frames that are marked if congestion occurs. However, ATM cells are not dropped since the marking threshold is below the capacity of the channel.

4.3.2 Fault Tolerancy

The CLP is part of the same failure group as the space switch and CWB. A fault in the CLP causes a side switch of the ATMU, under control of the ATMU CC.

Parity is used on all list and sequencer driven memories. Additional hardware such as a timer that checks for sanity and dead clock conditions are also employed. The memory driven sequencer program is downloaded by the ATMU CC as part of CLP initialization.

4.3.3 Control

The CLP is controlled by the ATMU CC. Registers exist on the CLP that cause the CLP to modify information in the linked list table and/or the ATM Address Mapper (AAM). In effect, the CLP simply writes ATMU CC data directly to those memories, but at a time that is synchronized with other CLP activities. The FSR request bits are inhibited by registers accessible directly to the ATMU CC. Other communications such as marked cell information, or control to mark cells is handled through registers 921 shared between the CLP and the ATMU CC. Any complex processing that does not have to be done on a cell by cell basis is performed by the ATMU CC.

In operation, after the SMP has connected a DS0 through a given SM MCTSI slice onto a NCT link, and has caused the ATMU central controller (ATMU CC) to connect the DS0 through the space switch into the correct virtual path memory in the CWB, at the time a virtual path is activated, the ATMU CC causes the virtual path address to be added to the list of active cells associated with the facility (FSR) the virtual path. At this point in time, the composite cells are transferred to the ATM network, and DS0 continuity exists (at this end). The ATMU CC then performs various actions discussed above to test and monitor DS0 continuity.

4.4 ATM Message Layer Device (FIG. 12)

4.4.1 MLD Functions

The ATM Message Layer Device (MLD) (FIG. 12) provides variable length message to ATM conversion for the 5ESS switch for the following three communication systems:

SM to SM, and SM to AM communications

SS7 Network: SM to SM communications in the toll network

Inter-PSU packet communications

By providing these interworking services, the ATM network can be used for message transport, thereby simplifying inter-SM message exchange within in the 5ESS switch, and/or eliminating the use of STPs for messaging between switches in the toll network. STPs used for point of presence for local carriers to the interexchange carrier are not affected by this use of ATM. However, reduction of STPs brings about a savings in operations cost and hardware costs.

Further, in accordance with the teachings presented herein, in the preferred embodiment, the Message Switch within 5ESS switch (described, for example, in the *AT&T Technical Journal* reference on pages 1418–1421) is eliminated from the 5ESS switch, and the CM Processor Intervention (CPI) function is provided as discussed below in Section 4.6.

Contained within the MLD are the SS7 Inter-Working Unit (SS7 IWU) (1020) and the SM Inter-Working Unit (intra-switch IWU) (1022), and the inter-PSU Working Unit (1024) as shown in FIG. 12. A NCT bus from the space switch of the ATMU transports one or more DS0 based channels that contain either SM or SS7 messages from the Message Handler and/or PSU to the MLD. This NCT bus is duplex, having a source in each of the duplicated portions of the space switch. Within the MLD, the bus is fanned out (via backplane) to the SS7, SM, and inter-PSU IWUs.

The outputs of the MLD on the ATM side are serial shift registers that are essentially in parallel with the shift registers of the CWB. This can be seen in FIG. 13 which shows a block diagram for an IWU. The CLP services requests from the MLD and interleaves the ATM based message cells with composite voice cells. The algorithm for interleaving is that composite cells are transmitted first (every 125 $\mu$s and then ATM based message cells. The 125 $\mu$s interval should not be overlapped with the next 125 $\mu$s interval for composite cells. The ATM based messages can be assumed to always have bandwidth on the facilities; facility usage is allocated in a way that guarantees that messaging bandwidth is always available. Simulations and/or field experience are required to determine a minimum adequate margin for sending messages on facilities for which composite cells are also transported.

In the incoming direction from the ATM network, the CLP translates ATM virtual path headers, determines whether the cell is a SS7, a SM, or an inter-PSU message based virtual path, and directs the cells to the correct one of the IWUs within the MLD. The IWUs receive cells and commence message re-assembly. Subsequently, the re-assembled messages are transmitted in DS0s on the NCT bus to the space switch of the ATMU. The IWUs must be able to associate a cell from a given virtual path with a given DS0, or set of DS0s for N*DS0 pipes.

An alternative to the above would be to have the SM, SS7, and inter-PSU IWU connect to the CBP directly via SDH/SONET facilities. However, this would use up limited facilities on the CBP for traffic loads that are a tiny fraction of the facility's throughput. For this reason the slight overhead of having the CLP route the cells internally is preferred. In addition, the DS0s must be multiplexed back into the 5ESS switch SM, and the NCT buses and links are the most economical arrangement for so doing.

An assumption is that at least one SM IWU is always equipped, since that is the only mechanism an SMP has to communicate with the AM or other SMPs. The SS7 IWUs are optionally equipped, so that they may or may not be present, depending on the application. For example, in international 5ESS switches, the SS7 links are often clustered in only one SM, and this SM may direct all of its SS7 traffic to one ATMU. In addition, the MLD design allows for a variable number of SS7 Signaling Data Links (SDL). This may imply variable number of SS7 IWUs, depending on the number of SDLs that one SS7 IWU can handle. This flexibility help specialized applications such as the 5ESS switch's International's Global SM (GSM), (the SM which has all the SS7 links). The GSM which has a centralized SS7 PSU that can generate a large number of individual SS7 SDLs, so that an ATMU that is able to terminate a significant number of SDLs may minimize the software impact on existing 5ESS switches.

4.4.1.1 ATM and Protocols

The following two sections after this one discuss the intra-switch, SS7, and inter-PSU IWU designs within the MLD. However, the interaction of ATM and intra-switch and SS7 protocols is first discussed and compared. A basic concept of ATM is that ATM provides transport level services only. To adhere to this concept, the SM IWU only relays intra-switch frames. It does not perform protocol processing in the usual packet switching sense. For example, retransmissions are not supported by the SM IWU. Protocol processors (i.e., PSU Protocol Handlers and/or Message Handlers) process Link Access Procedures (type) D (LAPD) protocol end-end over the ATM network. In essence, the SM IWU identifies the SM destination in an High-level Data Link Controller (HDLC) frame, assembles cells with the correct virtual path that corresponds to the destination SM, and then transmits the cells into the CBP (ATM network).

The same arrangement is used for SS7. The AT/VI network relays SS7 MTP packets between SS7 Signal Processors which are in the various switches of the network. An SS7 implementation features a single point to point link (see CCITT standard Q.703) that usually connects to an STP, not used herein. However, the SS7 network is point to multi-point, at the MTP layer. To rationalize the point to point ATM layer with the point to many point nature of MTP, the ATMU terminates the signaling link layer, and associates MTP packets with a virtual path to a destination that corresponds with the "MTP Point Code". The messages are assembled into cells, and then relayed over the ATM network. At the destination, the MTP packet is re-assembled, and a local signaling data link layer entity is used to send the SS7 packet back to the Message Handler or PSU Protocol Handler via DS0s on an NCT bus that connects to the space switch (as was the case in the SM IWU). This approach helps minimize the impact of the removal of STPs on a 5ESS switch or other switches since the ATMU essentially emulates the behavior of an STP (as viewed from the perspective of the PSU/PH) at the SDL level.

4.4.2 SM IWU 4.4.2.1 Functions

The function of the SM IWU is to associate LAPD frames with provisioned virtual paths, and then convert the frames to cells. As stated above, the SM IWU does not execute procedural LAPD on the intra-switch messages. However, the bit oriented LAPD protocol of the intra-switch messages must be processed to verify message integrity via Cyclic Redundancy Check (CRC), and more importantly, to remove bit stuffing from the message so as to be able to read the SM destination address. Only after the bit oriented protocol (BOP) is processed and the "bit stuffing" is removed can the SM destination address be read.

To accomplish the above, the SM IWU receives inter-SM LAPD messages on a provisioned number of time slots (e.g., 12 DS0s or 768 kilobit/second) on the NCT bus from the ATMU space switch into an HDLC device 1120, (FIG. 13) on the SM IWU. The HDLC device stores the inter-SM frame in a buffer from which the address (and CRC check result) can be read by the SM IWU internal controller. The controller associates the destination SM address with the correct virtual path. Then the frame with LAPD header is assembled into ATM cells using the Connection Oriented Network Services (CONS) procedures in accordance with the ATM Adaptation Layer specified in CCITT Standard 1.363. As a brief summary, these procedures involve the use of:

A bit field that indicates first segment (i.e., cell), middle segment, and last segment of the message A CRC that also indicates the integrity of the overall message A length field that indicates the number of bytes in the message An index that binds all the cells of a given message together.

In the above list, the term "message" is used synonymously with LAPD frame. The assembly to cells is accomplished by a modified direct memory access processor, the ATM Adaptation Layer Processor (AALP) that generates the cells, bit fields etc. The output of the AALP is connected to an LPU (FSR) that connects to the CLP. Currently only one FSR (connected to duplex LPUs) is supported by each IWU since the bandwidth from one facility is far beyond that which is necessary. When a cell is ready for transfer, hardware in the CLP will transfer from the IWU FSR to the LPU. No cell wide buffer is needed in the outgoing direction, due to the relatively low bandwidth requirements (as compared to the composite voice case).

In the reverse direction from the ATM network, the CLP reads the ATM header in the FSR that connects to the LPU. That FSR receives cells for both the composite memory (CWB) and MLD. At cell arrival, the CLP does not know if the cells are message based or composite. The CLP uses its ATM Address Mapper (AAM) (just as it would for composite voice) to determine if the cell should be sent to an IWU, or to the CWB (composite voice). For purposes of the immediately following discussion, the cells are assumed to be message based, and destined for an IWU. Otherwise the cells would have been loaded into the (composite cell) CWB. The CLP moves the cells to the SM IWU, or the SS7 IWU cell buffer 1170, (discussed below) or to the inter-PSU IWU. (This cell buffer 1170 is not the CWB 620 used for the composite voice.)

The flow of signaling, control and other narrow band messages are an example of data flowing from the CBP to the SM (the opposite of the direction illustrated in FIG. 13). The SM (intra-switch) IWU AALP copies frames from the its cell buffer into queues that exist on a per message basis. Multiple message segments (cells) may be received concurrently, so that the identifiers in the cells are used to separate the cells into complete messages. After assembly, the messages are shipped back on DS0s on the NCT bus through the space switch in the ATMU.

The SM IWU has a cell buffer because there must be sufficient buffering to be able to receive a burst of cells if "cell bunching" occurs. This means the "ATM front end" of the IWU must be able to receive cell bursts at facility rates for short periods of time. The cell buffer 1170 is circularly organized (FIFO), and holds the entire ATM header plus 48 bytes of data, unlike the CWB for composite cells which does not store the ATM header. (In the composite cell case, the CLP processes and discards the ATM header for composite cells since the header serves no logical function once the frame is in the CWB. In the message case, the ATM header is further processed to assemble a complete message from the ATM cells.)

Simulation studies and/or field experience can be used to determine the optimum minimum depth of local cell wide buffering. Normally, the traffic intensity is minimal compared to the throughput of the SM IWU, since the SM IWU only processes frames for one SM, and does not have to perform the processing to actually terminate the LAPD protocol as do its sources, the PSU Protocol Handlers or Message Handler.

4.4.2.2 SM IWU Fault Tolerance

The SM IWUs are spared on a simple duplication basis, since only one (plus its duplicate) are needed in an ATMU. This is because there are only two inter-SM channels from the MH to the other SMs and AM.

Because the bandwidth required for inter-SM signaling channels is small, an NCT link carrying such signaling channels can be served by a single IWU. The ATMU CC determines which SM IWU is active. The MLD NCT bus fanout mechanism creates a cross coupling between the NCT buses from the space switch, so that either SM IWU can be active regardless of which space switch side is active.

Faults are detected by parity checks on the NCT buses from the space switch, as well as the internal error checking means normally used with processors and controllers, such as parity checks on memories and sanity timers.

A separate type of fault tolerancy function regards message transport impairment. Two types exist, ATM impairment, and Message Handler DS0 channel impairment. Impairment means excessive cell or message error rates. The SM IWU indicates message error conditions to the ATMU CC, such as corrupted frames from the MH/PSU, or corrupted messages from the ATM network, if they exceed a certain threshold. This is detected in either the ATM header, CRC-4, the CRC check in the LAPD frame from the PSU PH or MH, or the CRC within the message as it is transported within ATM Connection Oriented Network Service (CONS). In the event of high ATM error rate, the ATMU CC can switch the SM IWU to the spare LPU (i.e., a facility protection switch) or take actions to diagnose the hardware between the SM IWU and the LPU (including the SM IWU). In the latter case, an ATMU side switch or SM IWU may be in order, depending on the coupling between the MLD and the space switch.

4.4.2.3 SM IWU Control

The ATMU CC communicates with the SM IWU via a control output bus connected from the ATMU CC to many of the units of the ATMU. In operation, the ATMU CC provisions virtual path destination addresses via this bus, and provisions DS0s through the space switch into the IWU. The ATMU CC does this as directed by the SMP. Provisioning is also performed in the CLP to load the AAM with the virtual paths that carry the messages. After this is provisioned, inter-SM/AM intra-switch messages can be sent at will by the SMP/MH, without any ATMU CC intervention, to any inter-SM/AM intra-switch destination.

4.4.3 SS7 IWU

4.4.3.1 Functions

The SS7 IWU is similar to the SM IWU, and occupies a position in the MLD that is parallel to the SM IWU. Therefore this section will primarily highlight the differences between the SM IWU and the SS7 IWU. The major difference between the SM IWU and the SS7 IWU are:

- SS7 IWU terminates SS7 link protocol, but SM IWU only processes bit level LAPD to be able to read SM destination address
- SS7 IWU is variably equipped, so that, as discussed above, it may or may not be present. Furthermore, the SS7 IWU allows a variable number of Signaling Data Links to be supported, in order to allow a 5ESS switch Global SM to be supported on one ATMU.

As stated in the section on ATM and Protocols, the SS7 IWU terminates the SS7 link (SDL, level 2) protocol as received from the PSU Protocol Handlers or Message Handlers on the NCT bus between the space switch and the MLD. The SS7 IWU then associates a virtual path with the MTP point code, assembles the packets into cells, and transfers them out to the ATM network. At the destination switch, the CLP routes the cells to the SS7 IWU. J which then assembles them back to packets, inserts them into a SS7 signaling data link frame, and sends them back on the NCT bus to the space switch towards the PSU Protocol Handlers or Message Handler. The ATM network is used only as a transport mechanism for MTP packets as was the case for the intra-switch messages processed by the SM IWU.

The design of a SS7 IWU and a SM BVU is very nearly identical. The NCT bus side of the IWUs are both HDLC based, and controllers that process Bit Oriented Protocol (BOP) can also process the SS7 SDL protocol. AT&T manufactures a controller set (2 devices, the ATT 7115 and ATT 7130) that perform this function for 32 channels with all channels at full utilization for SS7 SDL. The ATM front end and interaction with the CLP is likewise identical, and will not be repeated here. Primarily, the MTP Point Code is used in place of the SM destination for purposes of virtual address association.

In one alternative architecture, the SS7 and SM IWU are located on the same IWU. Throughput is not an issue, only the number of DS0s to be supported on one hardware card. Given the NCT bus size of 512 time slots, and the use of double size cards, more than 32 time slots may be supportable in one card, making the use of a single IWU attractive in cost.

4.4.3.2 Fault Tolerancy

The SS7 BVU has a fault tolerancy design different from the SM IWU. Because a variable number of SS7 IWUs are used in one ATMU, the SS7 IWU redundancy in the MLD is N+1, versus 1+1 as in the SM IWU. In an alternative arrangement, the redundancy is N+2.

4.4.3.3 Control

The SS7 IWU has similar control issues as does the SM IWU. The SMP provisions:

- Time slots from the Message Handler or PSU Protocol Handlers through the space switch to the SS7 IWU
- Maps in the SS7 IWU that associate Point Codes with virtual paths
- Virtual paths in the CLP.

4.4.4 Inter-PSU IWU

The Inter-PSU IWU works in essentially the same way as the inter-SM IWU, except that it switches packets supplied by PSU 519, packets which, in general, originate from and terminate to users. The IWU is transparent to the user level protocol being used.

4.5 ATMU Control

4.5.1 Functions

The NCT links connect the ATMU to the SM. Therefore, the same type of controller that is used in a digital trunk unit (DTU) or SONET Interface Unit (SIU) is used in the ATMU.

The ATMU CC operates and maintains the ATMU hardware as discussed in all the above sections, and therefore will not be repeated here.

4.5.1.1 Fault Tolerancy

The ATMU CC is 1+1 spared, and is in a separate failure group from the rest of the ATMU. Since the ATMU CC is a modified version of the SIU/DTU controller, no further discussion of the fault tolerancy aspects of the controller is required.

4.5.1.2 Control

In the 5ESS switch, a protocol handler (message handler (MH)) is used to interface between the SMP and the TSI; control and signaling messages can then be transmitted between the TSI and the ATMU's MLD. This Message Handler in the 5ESS switch is used to communicate with the ATMU CC. This communication is via time slots that arrive on the links, and that carry LAPD based messages which ultimately originate from the SMP. The ATMU CC processes the LAPD, and executes the commands. Certain special functions such as processor reset are put into the special NCT link time slot used to transmit control messages to the ATMU CC if ATMU CC sanity is lost altogether for either side. Special bits in a predesignated control channel are reserved on the NCT link to implement these functions.

As previously discussed, the ATMU can be located within the CBP, in which case the ATMU CC is controlled by a controller of the CBP.

4.6 CBR Processor Intervention (CPI)

The SMP Intervention capability that the AM uses to reset an insane SMP will now be discussed. In the current 5ESS switch, the AM controls message switch hardware to source bits in the Control Time Slot (CTS) of the NCT link. Since a goal of this design is to eliminate the Message Switch, the capability must be emulated by some combination of the CBP and the ATMU. This capability is implemented as follows:

Special virtual paths from the AM to the ATMU carry cells with multi-byte patterned data. These are repeatedly sent to the ATMU by the AM via the APH 1240 to perform CPI. ATMU hardware (the Facility Shift Registers) is able to detect the condition, and is hard wired to the space switch, which then generates the CTS CPI bit pattern to reset the SM. This multi-byte pattern data can be a long pseudo random sequence that has essentially zero probability of ever being generated, within cells that should never be sent except to reset a specific SM. The CBP is provisioned with these virtual paths between the AM and individual SMs.

5. AM and CBP Operations, Administration, Maintenances and Provisioning (OAMP) Platform The AM serves to support the entire 5ESS switch and CBP (including ATMUs) OAMP needs. These include download and control of the CBP, craft graphical display, and communication via ATM with SMs. FIG. 14 shows the AM/CBP system architecture as comprising the following components:

- ATM Management Module (AMM) including directly connected terminal. This is an adjunct fault tolerant processor that is an extension of the existing 5ESS switch AM, and serves to provided added processing throughput for new CBP and ATMU capabilities.
- Ethernet Bus to interconnect AM/AMM with Graphic Unit Interface (GUI), ATM Packet Handler (APH), and CBP.
- Small Computer System Interface (SCSI, an industry standard) peripherals for disk, tape, and CD ROM on-line documentation: These augment the existing AM non-volatile peripherals.
- GUI workstation terminals that supports existing 5ESS switch equipment, CBP, and ATMUs.
- ATM Packet Handler provides the AM/AMM with the ability to communicate via ATM over SONET to the SMs. The SMs terminate the APH's ATM in their ATMU MLD's. To communicate with SMs, the AM/AMM sends messages via Ethernet to the APH which performs the message to cell conversion and transmittal to CBP over SONET.

The GUI and non-volatile memory are commercial components whose control resides in AMM software. The design of the AMM and APH components are expanded in the following sections.

5.1 ATM Management Module

The AMM is a high capacity processing element of the AM:

- Processors: AMM The processors are N+K redundant connected by a Future Bus(+) technology, IEEE 896 Standard. Automatic hardware and software fault detection, and restart capabilities are built into the processor modules. The AMM itself is supported by the Administrative Module (AM) which is used to create a high reliability environment for the AMM processors.
- Memory Modules: The N+K processors share common memory modules that are used to store static and check-pointed data. Automatic hardware error detection capabilities are built into the memory modules. The memory modules are redundant, with data being stored in two memory modules; only the active module responds to read accesses. The memory modules connect to the processors via Future Bus(+).
- SCSI Peripheral Interface: There are two SCSI controllers in the AM/CBP Platform. In addition to mirrored disks, there is a cartridge tape drive for loading the AMM and a CD ROM is optionally equipped to store on-line documentation.
- Ethernet Transceivers: The CBP and GUI workstations are connected through duplicated Ethernet interfaces to the AMM.
- Dedicated AMM Terminal: A terminal directly to the processor complex, in order to access the core in the event both terminal controllers or Ethernet transceivers fail. This terminal does not have a GUI, and is intended for MML commands only.

5.2 APH

The APH is a modified IWU from the ATMU MLD. It is shown in FIG. 14. The Rate Adapt and BOP controller are removed and are replaced by an Ethernet Controller and Transceiver. The Ethernet controller places message into the buffer. The processor determines the proper ATM header (Virtual Circuit). The AALP performs the functions of converting the message to cells. Unlike the MLD IWU, the Cell Buffer connects directly to an LPU that transforms bits to SONET media as soon as the segments are available. There is no CLP to gate the transmission of the cell to the LPU.

6. Conclusion

It is to be understood that the above description is only of one preferred embodiment of the invention. Numerous other arrangements may be devised by one skilled in the art without departing from the scope of the invention. The invention is thus limited only as defined in the accompanying claims.

| APPENDIX A ACRONYMS AND ABBREVIATIONS | |
|---|---|
| AAL | ATM Adaptation Layer |
| AALP | ATM Adaptation Layer Processor |
| AAM | ATM Address Mapper |
| AM | Administrative Module |
| AMM | ATM Management Module |
| APH | ATM Packet Handler |
| ATM | Asynchronous Transfer Mode |
| ATMU | ATM Interface Unit |
| ATMU CC | ATMU Central Controller |
| BOP | Bit Oriented Protocol |
| CBP | Common Broadband Platform |
| CBR | Constant Bit Rate (traffic) |
| CCITT | Consultative Committee on International Telephone and Telegraph Standards |
| CD ROM | Compact Disk Read Only Memory |
| CLP | Cell List Processor |
| CONS | Connection Oriented Network Services |
| CPI | CBP Processor Intervention |
| CRC | Cyclic Redundancy Check |
| CTS | Control Time Slot |
| CWB | Cell Wide Buffer |
| DACS | Digital Access Crossconnect System |
| DCC | Digital Communications Channel |
| DS0 | A 65 kilobit/second PCM single channel signal |
| DS1 | A signal composed of 24 DS0 signals |
| DTU | Digital Trunk Unit |
| EOC | Embedded Operations Channel |
| FSR | Facility Shift Register |
| GSM | Global SM |
| GUI | Graphical User Interface |
| HDLC | High-level Data Link Controller |
| ISDN | Integrated Services Digital Network |
| IWU | Inter-Working Unit |
| LAPB | Link Access Procedures (type) B |
| LAPD | Link Access Procedures (type) D |
| LPU | Line Processing Unit |
| MCTSI | Module Controller Time Slot Interchange |
| MLD | Messagae Layer Device |
| MML | Man Machine Language |
| MTP | Message Transfer Part |
| NCT | Network Control and Timing (link) |
| NLI | NCT Link Interface |
| NNI | Network Node Interface |
| OAM | Operations Administration Maintenance |
| OAMP | Operations Administration Maintenance Provisioning |
| PCT | Peripheral Control and Timing (link) |
| PH | Protocol Handler |
| PSU | Packet Switching Unit |
| PVC | Permanent Virtual Circuit |
| SCCP | Signaling Control and Connection Part |
| SCSI | Small Computer System Interface (an Industry standard) |
| SDH | Synchronous Digital Hierarchy |
| SDL | Signaling Data Link (SS7) |
| SIU | SONET Interface Unit or SM Interface Unit |
| SM | Switch Module |
| SMDS | Switched Megabit Data Switch |
| SMP | Switch Module Processor |

APPENDIX A
ACRONYMS AND ABBREVIATIONS

| | |
|---|---|
| SONET | Synchronous Optical NETwork |
| SR | Shift Register |
| SS7 | Signaling System (Number) 7 |
| STM | Synchronous Time Multiplex |
| STP | Signal Transfer Point |
| STS | Synchronous Time Signal |
| TSA | Time Slot Assign |
| TSI | Time Slot Interchange |
| VBR | Variable Bit Rate (traffic) |
| VC | Virtual Circuit |

We claim:

1. A telecommunications network comprising:
a plurality of access switches;
a signal transmission network;
ones of said access switches being interconnected by said signal transmission network;
said access switches comprising means for converting a plurality of synchronous pulse code modulation (PCM) signals to a plurality of asynchronous transfer mode (ATM) signals;
wherein each of said plurality of ATM signals comprise composite cells for periodically transmitting PCM data for a plurality of telecommunications calls on a plurality of PCM signal streams over a common virtual circuit connecting two access switches;
said signal transmission network comprising a plurality of common broadband platform (CBP) ATM crossconnect switches for interconnecting links, said links for transmitting ATM signals to access switches and to other CBP switches.

2. The network of claim 1 wherein ones of said access switches comprise a CBP switch.

3. The network of claim 2 wherein signaling data as well as telecommunications calls are transmitted over said signal transmission network.

4. The network of claim 1 wherein ones of said access switches are interconnected by inter-access switch links carrying ATM signals.

5. The network of claim 1 wherein said composite cells carry bytes of PCM data for 48 calls and each of said composite cells carries one byte per call.

6. The network of claim 1, wherein said composite cells carry bytes of PCM data for 48 - A calls, wherein A is an integer ≧1, ≦46, and each of said composite cells carries one byte per call, and an A-byte index to differentiate among a plurality of virtual circuits using a common path.

7. The network of claim 6 wherein A=2.

8. The network of claim 1 wherein ones of said composite cells carry a plurality of bytes for a call.

9. The network of claim 8 wherein said composite ones of said cells carry a plurality of bytes for said call and a single byte for each of a plurality of other calls.

10. In a switching system of a telecommunications network comprising a plurality of interconnected switching systems, apparatus comprising:
means for converting from a plurality of synchronous pulse code modulated (PCM) signals, each signal for carrying a plurality of PCM channels, to a plurality of first output signals, each comprising a plurality of composite packets transmitted periodically and each composite packet comprising bytes of said PCM signals for a plurality of PCM channels from a plurality of said plurality of synchronous PCM signals;
means, connected to said means for converting, for switching each packet of said first output signals to one of a plurality of second output signals, said second output signals comprising packets, each packet for transmission over said network to a destination switching system;
said network comprising means for switching individual packets of said second output signals to one of a plurality of destination switching systems.

11. The apparatus of claim 10 wherein said means for converting comprises means for converting into said plurality of first output signals, each of said first output signals comprising a plurality of packets transmitted periodically at a rate which is a multiple of a period of said synchronous PCM signals.

12. The apparatus of claim 11 wherein said multiple is one and each of said plurality of packets transmitted periodically comprises only a single signal for a plurality of PCM channels.

13. The apparatus of claim 12 wherein said output signals carry Asynchronous Transfer Mode (ATM) signals and said plurality of packets transmitted periodically is a plurality of ATM cells.

14. The apparatus of claim 10 wherein said first output signals comprise Asynchronous Transfer Mode (ATM) signals and said packets of said first output signals are cells of said ATM signals.

15. The apparatus of claim 10 wherein said first output signals carry Asynchronous Transfer Mode (ATM) signals and wherein said means for converting further comprise means for converting received packets of data received over a data transmission channel into variable bit rate (VBR) cells for transmission in an ATM signal.

16. The apparatus of claim 15 wherein at least one of said first output signals carry VBR telecommunications call signaling cells and wherein said signaling cells are given priority over other VBR cells in transmission of said ATM signal.

17. The apparatus of claim 15 wherein said plurality of composite packets transmitted periodically are ATM constant bit rate (CBR) cells and wherein said ATM CBR cells are given priority over said VBR cells.

18. The apparatus of claim 10 wherein at least one of said means for converting is connected to a plurality of switching modules or systems and wherein said means for converting combines signals from two or more switching modules or systems into a single set of packets transmitted periodically, and wherein ones of said single set of packets transmitted periodically carry signals from two or more switching modules or switches.

19. The apparatus of claim 18 wherein each of said cells for carrying a plurality of channels carries up to 48 channels in a 48 byte payload of an ATM cell.

20. The apparatus of claim 19 wherein each ATM cell carries one byte for each of (48 - A) channels, wherein A is an integer ≧1, ≦46; and
wherein A bytes are reserved for an index to permit a single permanent virtual circuit (PVC) identification to be used for a plurality of PVCs connecting a common source and a common destination node using a common set of intermediate nodes.

21. The apparatus of claim 20 wherein A=2.

22. The apparatus of claim 10 wherein said means for switching packets is directly connectable to a source and destination for Asynchronous Transfer Mode (ATM) signals.

23. The apparatus of claim 22 wherein ones of said second output signals are further for transmission over said network, to another of said means for switching packets, for switching received ATM cells to a destination user.

24. The apparatus of claim 15 wherein said VBR packets comprise packets for transmitting messages between a processor of a switching system or module for supplying one of said synchronous PCM signals and a processor of said means for switching packets.

25. The apparatus of claim 15 wherein ones of said VBR cells are for transmission between two switching systems or modules each for supplying at least one of said synchronous PCM signals.

26. The apparatus of claim 25 wherein said ones of said VBR cells are transmitted between processors of said two switching systems or modules.

27. The apparatus of claim 10 further comprising:
means for converting signals from telecommunications lines to channels of one of said plurality of synchronous PCM signals.

28. The apparatus of claim 10 wherein said means for converting is connectable to a plurality of switching systems or modules each for providing one or more of said plurality of synchronous PCM signals.

29. The apparatus of claim 10 wherein a switching system or module provides at least two synchronous PCM signals, different ones of said at least two signals being connected to different ones of at least two of said means for converting.

30. The apparatus of claim 10 further comprising:
means for generating an arbitrary signal for transmission in one of said first output signals; and
means for receiving and checking for said arbitrary signal in order to verify continuity of a path for said one of said first output signals.

31. A telecommunications network comprising:
a plurality of access switches; and
a plurality of common broadband platform (CBP) Asynchronous Transfer Mode (ATM) crossconnect switches;
wherein each access switch comprises means for converting a plurality of pulse code modulated (PCM) multiplexed input signals into ATM signals;
wherein ones of said CBP switches are connected to ones of said access switches;
wherein said ATM signals converted from said PCM signals and being switched in said access switches and in said CBP switches comprise periodically transmitted composite cells, each composite cell for transmitting a plurality of PCM channels from a plurality of said PCM signals, said composite cells being transmitted on constant bit rate (CBR) permanent virtual circuits (PVCs) interconnecting two access switches, said composite cells being transmitted at a repetition rate whose period is a multiple of a basic PCM sampling rate.

32. The apparatus of claim 31 wherein said multiple is one and said sampling period of said PCM signals is 125 μs and wherein each of said plurality of channels carried in said cells occupies one byte of a payload of the periodically transmitted cells.

33. The apparatus of claim 31 wherein each access switch comprises at least one node and at least one of said access switches comprises a plurality of nodes, said nodes each for converting PCM signals into ATM signals, and wherein said PVCs interconnect nodes of said access switches.

34. The apparatus of claim 31 wherein ones of said access switches are interconnected by at least one link carrying ATM signals to others of said access switches.

35. A telecommunications network comprising:
a plurality of access switches;
wherein each access switch comprises means for converting a plurality of pulse code modulated (PCM) multiplexed input signals into ATM signals;
wherein ATM signals being switched in said access switches comprise periodically transmitted composite cells each of which carries a plurality of PCM channels from a plurality of said PCM signals, said composite cells being transmitted on constant bit rate (CBR) permanent virtual circuits (PVCs) interconnecting two access switches, said composite cells being transmitted at a repetition rate whose period is a multiple of a basic PCM sampling rate.

36. The apparatus of claim 35 wherein each access switch comprises at least one node and at least one of said access switches comprises a plurality of nodes, said nodes each for converting PCM signals into ATM signals, and wherein said PVCs interconnect nodes of said access switches.

37. The network of claim 35 wherein said CBR PVCs are switched among said plurality of access switches by a signal transmission network comprising at least one common broadband platform (CBP) ATM crossconnect switch for interconnecting links carrying said CBR PVCs.

38. The network of claim 35 wherein ones of said access switches are interconnected by at least one link carrying ATM signals to others of said access switches.

39. A telecommunications network comprising:
a plurality of access switches; and
a plurality of common broadband platform (CBP) Asynchronous Transfer Mode (ATM) crossconnect switches;
wherein each access switch comprises means for converting a plurality of pulse code modulated (PCM) multiplexed input signals into ATM signals;
wherein ones of said CBP switches are connected to ones of said access switches;
wherein ATM signals being switched in said access switches and in said CBP switches comprise periodically transmitted composite cells each composite cell for transmitting a plurality of PCM channels from a plurality of said PCM signals, said composite cells being transmitted on constant bit rate (CBR) permanent virtual circuits (PVCs) interconnecting two access switches, said composite cells being transmitted at a repetition rate whose period is a multiple of a basic PCM sampling rate.

40. The apparatus of claim 39 wherein each access switch comprises at least one node and at least one of said access switches comprises a plurality of nodes, said nodes each for converting PCM signals into ATM signals, and wherein said PVCs interconnect nodes of said access switches.

* * * * *